(12) United States Patent
Froelicher et al.

(10) Patent No.: US 9,106,651 B2
(45) Date of Patent: Aug. 11, 2015

(54) SENDING HUMAN INPUT DEVICE COMMANDS OVER INTERNET PROTOCOL

(75) Inventors: Jeff S. Froelicher, San Diego, CA (US); Xiaolong Huang, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 13/612,210

(22) Filed: Sep. 12, 2012

(65) Prior Publication Data

US 2013/0246565 A1    Sep. 19, 2013

Related U.S. Application Data

(60) Provisional application No. 61/536,393, filed on Sep. 19, 2011, provisional application No. 61/583,254, filed on Jan. 5, 2012.

(51) Int. Cl.
| | |
|---|---|
| *H04L 29/08* | (2006.01) |
| *G06F 3/14* | (2006.01) |
| *H04L 29/06* | (2006.01) |
| *H04N 21/41* | (2011.01) |
| *H04N 21/436* | (2011.01) |

(52) U.S. Cl.
CPC .......... *H04L 67/10* (2013.01); *G06F 3/14* (2013.01); *H04L 65/4084* (2013.01); *H04N 21/4108* (2013.01); *H04N 21/436* (2013.01); *H04L 67/2823* (2013.01)

(58) Field of Classification Search
CPC .............. H04B 1/00; H04B 1/02; H04B 1/06; H04B 1/086; H04B 1/38; H04B 1/3805; H04B 1/76; H04B 7/00; H04B 7/005; H04B 2001/02; H04B 2001/06; H04B 2001/3827; H04B 2001/3833; H04L 5/00; H04L 5/02; H04L 5/14; H04L 5/1407; H04L 5/1415; H04L 5/1438; H04L 5/1476; H04L 5/1484; H04L 5/16; H04L 5/18; H04L 5/20; H04L 7/0075; H04L 7/0091; H04L 7/00; H04L 7/0004; H04L 29/00–29/06027; H04L 29/06102; H04L 29/06122; H04L 29/06129; H04L 29/06163; H04L 29/06176; H04L 1/00; H04L 1/00058; H04L 1/00061; H04L 1/00066; H04L 1/00127; H04L 1/00129; H04L 1/0035; H04L 1/00408; H04L 1/00411; H04L 1/00413; H04L 1/0044; H04L 21/4108; H04L 21/436; H04L 67/2823; G06F 1/00; G06F 3/00; G06F 3/005; G06F 3/007; G06F 3/01; G06F 3/011–3/017; G06F 3/02; G06F 3/0227; G06F 3/023; G06F 3/0231–3/0238; G06F 3/03; G06F 3/033; G06F 3/03541; G06F 3/03547–3/0362; G06F 3/037–3/038; G06F 3/14; G06F 3/1431; G06F 15/16; G06F 15/162; G06F 15/163; G06F 15/167; G06F 15/17; G06F 15/173; G06F 15/17306–15/17331; G06F 3/048; G06F 3/1423; G06F 3/1454; G06F 9/00; G06F 9/06; G06F 13/00; G06F 13/10–13/107; G06F 13/12–13/128; G06F 15/00; G06F 15/02; G06F 15/0225; G06F 17/00; H04N 7/173; H04N 7/26; G09G 5/00; G09G 5/08; G05F 1/70

USPC ................. 709/201–209, 212–213, 216–218, 709/220–221, 227–232, 247, 248, 237; 370/464, 466, 469, 474
See application file for complete search history.

(56) References Cited

U.S. PATENT DOCUMENTS

| | | | | |
|---|---|---|---|---|
| 6,225,984 | B1 * | 5/2001 | Crawford | 345/173 |
| 6,263,392 | B1 * | 7/2001 | McCauley | 710/305 |
| 6,311,228 | B1 * | 10/2001 | Ray | 719/321 |
| 6,615,299 | B1 * | 9/2003 | Chu et al. | 710/65 |
| 6,954,355 | B2 * | 10/2005 | Gerstner et al. | 361/679.09 |
| 7,127,524 | B1 * | 10/2006 | Renda et al. | 709/245 |
| 7,671,758 | B1 * | 3/2010 | Seidel et al. | 340/12.28 |
| 7,716,385 | B2 * | 5/2010 | Saint-Hilaire et al. | 710/11 |
| 7,870,496 | B1 * | 1/2011 | Sherwani | 715/761 |

| | | | |
|---|---|---|---|
| 7,895,532 B2* | 2/2011 | Scott et al. | 715/810 |
| 8,543,663 B2* | 9/2013 | Rehiman et al. | 709/217 |
| 8,599,194 B2* | 12/2013 | Lewis et al. | 345/419 |
| 8,612,518 B2* | 12/2013 | Wu et al. | 709/204 |
| 8,634,390 B2* | 1/2014 | Ramakrishnan et al. | 370/338 |
| 8,644,354 B2* | 2/2014 | George et al. | 370/522 |
| 8,689,104 B2* | 4/2014 | Thiyagarajan et al. | 715/734 |
| 2001/0041973 A1* | 11/2001 | Abkowitz et al. | 703/23 |
| 2002/0077764 A1* | 6/2002 | Milios et al. | 702/122 |
| 2002/0111999 A1* | 8/2002 | Andersson | 709/203 |
| 2002/0133581 A1* | 9/2002 | Schwartz et al. | 709/223 |
| 2003/0174125 A1* | 9/2003 | Torunoglu et al. | 345/168 |
| 2004/0199702 A1* | 10/2004 | Baba | 710/305 |
| 2005/0013103 A1* | 1/2005 | Chandley | 361/683 |
| 2005/0057521 A1* | 3/2005 | Aull et al. | 345/172 |
| 2005/0246470 A1* | 11/2005 | Brenner | 710/303 |
| 2006/0021021 A1* | 1/2006 | Patel | 726/13 |
| 2006/0129700 A1* | 6/2006 | Bopardikar | 710/2 |
| 2006/0131415 A1* | 6/2006 | Irons | 235/454 |
| 2006/0290326 A1* | 12/2006 | Bhesania et al. | 323/210 |
| 2007/0228164 A1* | 10/2007 | Lu et al. | 235/441 |
| 2007/0283389 A1* | 12/2007 | Hallberg | 725/37 |
| 2008/0022298 A1* | 1/2008 | Cavicchia | 725/25 |
| 2008/0088602 A1* | 4/2008 | Hotelling | 345/173 |
| 2008/0120448 A1* | 5/2008 | Shi et al. | 710/72 |
| 2008/0183839 A1* | 7/2008 | Shuqair et al. | 709/217 |
| 2008/0266253 A1* | 10/2008 | Seeman et al. | 345/158 |
| 2008/0274695 A1* | 11/2008 | Muth | 455/41.2 |
| 2008/0278446 A1* | 11/2008 | Schifter | 345/158 |
| 2008/0316984 A1* | 12/2008 | Takasu | 370/338 |
| 2009/0070436 A1* | 3/2009 | Dawes et al. | 709/219 |
| 2009/0258665 A1* | 10/2009 | Bourlas et al. | 455/522 |
| 2009/0298535 A1* | 12/2009 | Klein et al. | 455/556.1 |
| 2009/0305789 A1* | 12/2009 | Patil | 463/42 |
| 2010/0064005 A1* | 3/2010 | Amaya et al. | 709/204 |
| 2010/0070925 A1* | 3/2010 | Einaudi et al. | 715/830 |
| 2010/0083338 A1* | 4/2010 | Chiang | 725/139 |
| 2010/0169945 A1* | 7/2010 | Kennedy et al. | 725/110 |
| 2011/0013572 A1* | 1/2011 | Huang et al. | 370/329 |
| 2011/0047465 A1* | 2/2011 | Thiyagarajan et al. | 715/734 |
| 2011/0085526 A1* | 4/2011 | Joseph et al. | 370/338 |
| 2011/0086619 A1* | 4/2011 | George et al. | 455/414.1 |
| 2011/0106881 A1* | 5/2011 | Douville et al. | 709/203 |
| 2011/0107388 A1* | 5/2011 | Lee et al. | 725/118 |
| 2011/0113169 A1* | 5/2011 | Maeng et al. | 710/106 |
| 2011/0161839 A1* | 6/2011 | Farris et al. | 715/758 |
| 2011/0270994 A1* | 11/2011 | Ulupinar et al. | 709/227 |
| 2012/0159372 A1* | 6/2012 | Stallings et al. | 715/773 |
| 2012/0185790 A1* | 7/2012 | Bae et al. | 715/769 |
| 2013/0002949 A1* | 1/2013 | Raveendran et al. | 348/469 |
| 2013/0003621 A1* | 1/2013 | Huang et al. | 370/310 |
| 2013/0003622 A1* | 1/2013 | Huang et al. | 370/310 |
| 2013/0003623 A1* | 1/2013 | Raveendran et al. | 370/310 |
| 2013/0003624 A1* | 1/2013 | Huang et al. | 370/310 |
| 2013/0009873 A1* | 1/2013 | Huang et al. | 345/163 |
| 2013/0009887 A1* | 1/2013 | Huang et al. | 345/173 |
| 2013/0009996 A1* | 1/2013 | Raveendran et al. | 345/660 |
| 2013/0013318 A1* | 1/2013 | Huang et al. | 704/275 |
| 2013/0033435 A1* | 2/2013 | Raveendran et al. | 345/173 |
| 2013/0033496 A1* | 2/2013 | Raveendran et al. | 345/428 |
| 2013/0089006 A1* | 4/2013 | Huang et al. | 370/259 |
| 2013/0139210 A1* | 5/2013 | Huang et al. | 725/109 |
| 2013/0145050 A1* | 6/2013 | Huang et al. | 710/3 |
| 2013/0179029 A1* | 7/2013 | Wang et al. | 701/32.7 |
| 2013/0179605 A1* | 7/2013 | Huang et al. | 710/20 |
| 2013/0195119 A1* | 8/2013 | Huang et al. | 370/468 |
| 2013/0246663 A1* | 9/2013 | Raveendran et al. | 710/8 |
| 2013/0311693 A1* | 11/2013 | Huang et al. | 710/303 |
| 2013/0311694 A1* | 11/2013 | Bhamidipati et al. | 710/303 |
| 2013/0316681 A1* | 11/2013 | Huang et al. | 455/414.1 |
| 2014/0059264 A1* | 2/2014 | Sudak | 710/303 |
| 2014/0066048 A1* | 3/2014 | Swedenburg et al. | 455/420 |

FOREIGN PATENT DOCUMENTS

JP     2005275957 A     10/2005

OTHER PUBLICATIONS

Universal Serial Bus (USB)—Device Class Definition for Human Interface Devices (HID), Version 1.11; McGowan; Jun. 27, 2001.*
"Schema"—Definition by Merriam Webster Dictionary.*
Human Interface Device Tutorial; Silicon Labs; Nov. 22, 2006.*
McGowan (Universal Serial Bus (USB) Device Class Definition for Human Interaface Devices (HID), Version 1.11).*
Really Basic—Where is the OS stored, CyberTechHelp, Jul. 2008.*
International Search Report and Written Opinion—PCT/US2012/056087—ISA/EPO—Jan. 22, 2013.

* cited by examiner

*Primary Examiner* — Brian J Gillis
*Assistant Examiner* — Boris Grijalva Lobos
(74) *Attorney, Agent, or Firm* — Donald C. Kordich

(57) ABSTRACT

A source device in a wireless display (WD) system stores a plurality of preconfigured formats. Each of the preconfigured formats is associated with a different type of human input device (HID). The source device receives one or more Internet Protocol (IP) packets from a sink device in the WD system. The one or more IP packets include a HID command (HIDC) input report. The source device identifies, based on data in the one or more IP packets, one of the preconfigured formats and parses the HIDC input report based on the identified preconfigured format in order to determine a user input. The source device then generates media data in response to the user input and sends the media data to the sink device.

32 Claims, 8 Drawing Sheets

| BIT OFFSET | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | VERSION | | | T | RESERVED | | | | | | | | INPUT CATEGORY | | | |
| 16 | TIMESTAMP (OPTIONAL) | | | | | | | | | | | | | | | |
| 32 | LENGTH | | | | | | | | | | | | | | | |
| | INPUT BODY | | | | | | | | | | | | | | | |

SENDING HUMAN INPUT DEVICE COMMANDS OVER INTERNET PROTOCOL

This application claims the benefit of U.S. Provisional Patent Application No. 61/536,393, filed Sep. 19, 2011, and U.S. Provisional Patent Application No. 61/583,254, filed Jan. 5, 2012, the entire content of both of which are hereby incorporated by reference.

TECHNICAL FIELD

The disclosure relates to transport and playback of media data.

BACKGROUND

Wireless display (WD) systems include a source device and one or more sink devices. The source device may also be referred to as an "application server." The source device may be a device that is capable of transmitting media content within a wireless local area network. A sink device may be a device that is capable of receiving and rendering media content. A sink device may also be referred to as a "display client." The source device and the sink device may be either mobile devices or wired devices. As mobile devices, for example, the source device and the sink devices may comprise mobile telephones, tablet computers, laptop or other portable computers, portable computers with wireless communication cards, personal digital assistants (PDAs), portable media players, digital image capturing devices, such as cameras or camcorders, or other devices with wireless communication capabilities, including so-called "smart" phones and "smart" pads or tablets, or other types of wireless communication devices. As wired devices, for example, the source device and the sink device may comprise televisions, desktop computers, monitors, projectors, printers, audio amplifiers, set top boxes, gaming consoles, routers, digital video disc (DVD) players, and media servers.

A source device may send media data, such as audio video (AV) data, to one or more sink devices participating in a particular media share session. The media data may be played back at both a local display of the source device and at the displays of each of the sink devices. More specifically, each of the participating sink devices may render the received media data for presentation on its screen and audio equipment. In some cases, a user of a sink device may apply user inputs to the sink device, such as touch inputs and remote control inputs.

SUMMARY

In one example, a source device in a wireless display (WD) system stores a plurality of preconfigured report formats. Each of the preconfigured report formats may be associated with a different type of human input device (HID). The source device may receive one or more Internet Protocol (IP) packets from a sink device in the WD system. The one or more IP packets may include a HID command (HIDC) input report. The source device may identify, based on data in the one or more IP packets, one of the preconfigured report formats and may parse the HIDC input report based on the identified preconfigured report format in order to determine a user input. The source device may then generate media data in response to the user input and may send the media data to the sink device.

In one example, this disclosure describes a method comprising storing, at a source device, a plurality of preconfigured report formats. Each of the preconfigured report formats is associated with a different type of HID. In addition, the method comprises receiving, at the source device, one or more IP packets from a sink device. The one or more IP packets comprise a HIDC input report. The method also comprises identifying, based on data in the one or more IP packets, one of the preconfigured report formats. In addition, the method comprises parsing the HIDC input report based on the identified preconfigured report format in order to determine a user input. Furthermore, the method comprises generating media data in response to the user input. The method also comprises sending the media data from the source device to the sink device.

In another example, this disclosure describes a method comprising receiving an indication of a user input from a HID. The method also comprises generating, based on the user input, a HIDC input report that conforms to a report format. In addition, the method comprises sending one or more IP packets to a source device. The IP packets comprise the HIDC input report and a HID type indicator that identifies the report format. Furthermore, the method comprises receiving media data from the source device, the media data based on the user input.

In another example, this disclosure describes a computing device comprising one or more processors configured to store a plurality of preconfigured report formats. Each of the preconfigured report formats is associated with a different type of HID. The one or more processors are also configured to receive one or more IP packets from a sink device. The one or more IP packets comprise a HIDC input report. In addition, the one or more processors are configured to identify, based on data in the one or more IP packets, one of the preconfigured report formats. The one or more processors are also configured to parse the HIDC input report based on the identified preconfigured report format in order to determine a user input. In addition, the one or more processors are configured to generate media data in response to the user input. The one or more processors are also configured to send the media data from the computing device to the sink device.

In another example, this disclosure describes a computing device that comprises one or more processors configured to receive an indication of user input from a HID. The one or more processors are also configured to generate, based on the user input, a HIDC input report that conforms to a report format. In addition, the one or more processors are configured to send one or more IP packets to a source device. The IP packets comprise the HIDC input report and a HID type indicator that identifies the report format. Furthermore, the one or more processors are configured to receive media data from the source device, the media data based on the user input.

In another example, this disclosure describes a computing device that comprises means for storing a plurality of preconfigured report formats. Each of the preconfigured report formats is associated with a different type of HID. In addition, the computing device comprises means for receiving one or more IP packets from a sink device. The one or more IP packets comprises a HIDC input report. Furthermore, the computing device comprises means for identifying, based on data in the one or more IP packets, one of the preconfigured report formats. The computing device also comprises means for parsing the HIDC input report based on the identified preconfigured report format in order to determine a user input. In addition, the computing device comprises means for generating media data in response to the user input. The computing device also comprises means for sending the media data from the computing device to the sink device.

In another example, this disclosure describes a computing device that comprises means for receiving an indication of user input from a HID. The computing device also comprises means for generating, based on the user input, a HIDC input report that conforms to a report format. In addition, the computing device comprises means for sending one or more IP packets to a source device. The IP packets comprise the HIDC input report and a HID type indicator that identifies the report format. Furthermore, the computing device comprises means for receiving media data from the source device, the media data based on the user input.

In another example, this disclosure describes a computer program product that comprises one or more computer readable storage media that store instructions that, when executed, configure one or more processors of a computing device to store, at the computing device, a plurality of preconfigured report formats. Each of the preconfigured report formats is associated with a different type of HID. The instructions also configure the one or more processors to receive one or more IP packets from a sink device. The one or more IP packets comprise a HIDC input report. In addition, the instructions configure the one or more processors to identify, based on data in the one or more IP packets, one of the preconfigured report formats. Furthermore, the instructions configure the one or more processors to parse the HIDC input report based on the identified preconfigured report format in order to determine a user input. The instructions also configure the one or more processors to generate media data in response to the user input. In addition, the instructions configure the one or more processors to send the media data from the source device to the sink device.

In another example, this disclosure describes a computer program product that comprises one or more computer readable storage media that store instructions that, when executed, configure one or more processors of a computing device to receive an indication of user input from a HID. Furthermore, the instructions configure the one or more processors to generate, based on the user input, a HIDC input report that conforms to a report format. In addition, the instructions configure the one or more processors to send one or more IP packets to a source device. The IP packets comprise the HIDC input report and a HID type indicator that identifies the report format. The instructions also configure the one or more processors to receive media data from the source device, the media data based on the user input.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 6 is a conceptual diagram that illustrates an example format of a UIBC message.

DETAILED DESCRIPTION

Figure 1:
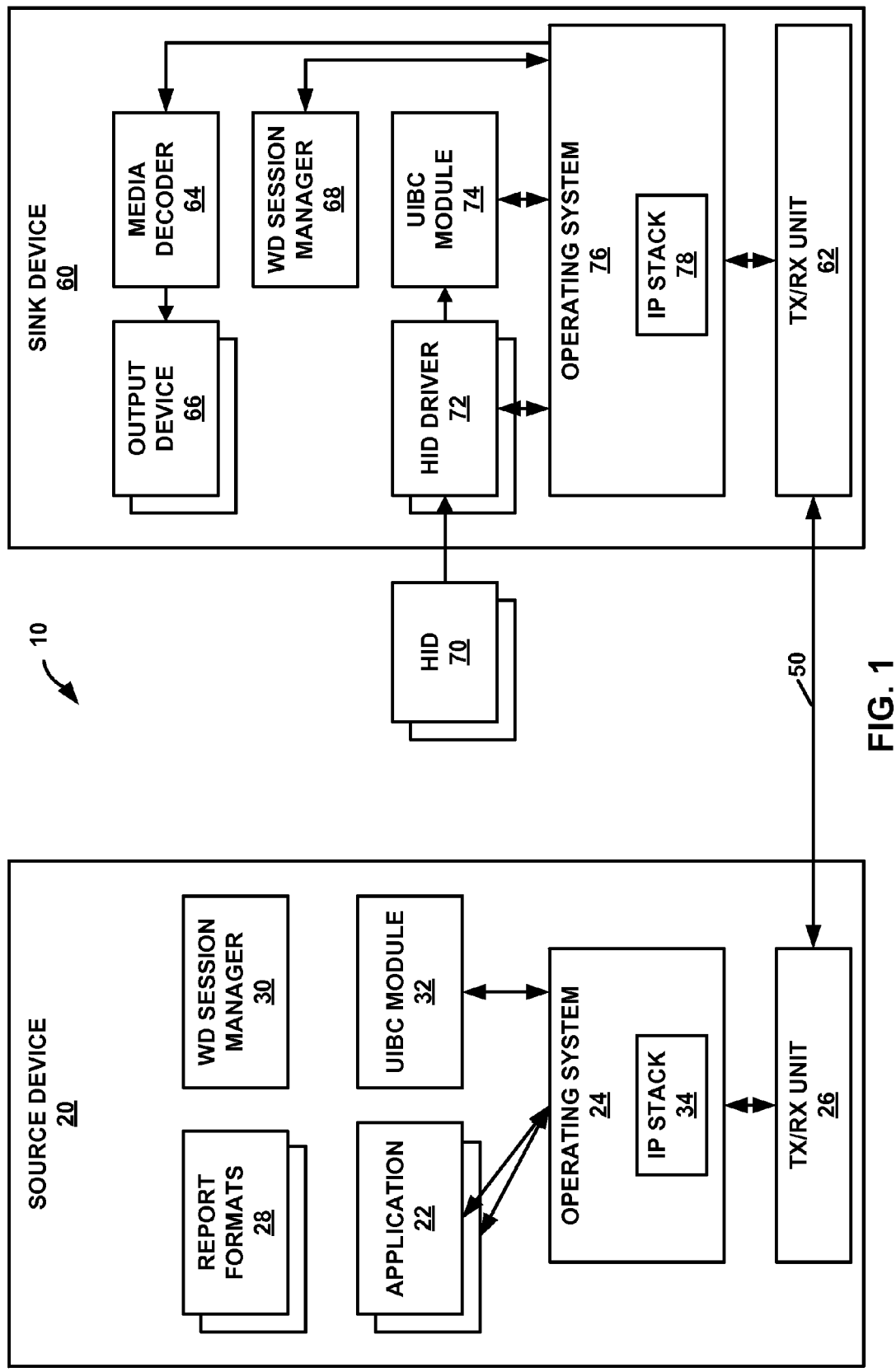
FIG. 1 is a block diagram illustrating a wireless communication system that includes a source device and a sink device.

In general, this disclosure describes techniques for handling user input in a Wireless Display (WD) system. A WD system includes at least two computing devices. One of the computing devices acts as a media source and another one of the computing devices acts as a media sink. The computing device that acts as a media source (i.e., the source device) may transmit encoded media data over a wireless channel to the computing device that acts as the media sink (i.e., the sink device). The sink device may decode the encoded video data and display the decoded video data on a display screen.

Furthermore, in a WD system, the sink device may receive user inputs from human input devices (HIDs), such as mice, digital pens or styluses, keyboards, and touchscreens. The sink device may transmit input messages to the source device. The input messages describe the user input received by the sink device. Upon receiving an input message, the source device may process the user input described by the input message and generate media data in response to the user input. The source device may then send this media data to the sink device.

The sink device may generate and transmit various types of input messages. For instance, during the setup of a session between the source device and the sink device, the sink device may indicate to the source device one or more HIDs connected to the sink device. After the setup of the session, the sink device may generate and transmit generic input messages that describe user input from various classes of HIDs. When the sink device receives an indication of user input from a particular HID, the sink device may determine that the particular HID belongs to a particular class of HIDs. Different classes of HIDs may be associated with different report formats. The classes of HIDs may be defined by a standard, such as a Wi-Fi display (WFD) standard. The report format associated with a class of HIDs may specify a format for generic input messages that describe user inputs received by HIDs in the class of HIDs. After the sink device determines that the particular HID belongs to the particular class of HIDs, the sink device may generate a generic input message that conforms to the report format associated with the particular class of HIDs. In this way, the report formats of generic input messages may be generic to any HID that belongs to the particular class of HIDs. The source device may be preconfigured to interpret generic input messages.

In addition to generating and transmitting generic input messages, the sink device may generate and transmit Human Input Device Command (HIDC) input reports. When the sink device receives an indication of a user input detected by a particular HID, a driver running on the sink device may generate a HIDC input report that describes the user input. The report format of the HIDC input report may be specific to the particular HID and not necessarily generic to the class of HIDs to which the particular HID belongs. For instance, there may be different report formats for HIDC input reports that describe user input detected by two different types of mice.

The report formats of HIDC input reports may conform to various HIDC standards, such as the Universal Serial Bus (USB) or BLUETOOTH standards.

Generating and transmitting HIDC input reports may have certain advantages over generating and transmitting generic input messages. For example, a particular HID within a particular class of HIDs may be able to receive user input that cannot be described using the generic report format associated with the particular class of HIDs. In this example, a HIDC input report may be able to describe such user input. Furthermore, it may be more complex for the sink device to generate and the source device to parse generic input messages than HIDC input reports. In this way, the use of HIDC input reports may help the source device and sink device converse processing resources and electrical energy.

In accordance with the techniques of this disclosure, the source device may store a plurality of preconfigured report formats. Each of the preconfigured formats is associated with a different type of human input device (HID). The source device may receive one or more Internet Protocol (IP) packets from a sink device. The one or more IP packets may comprise a HIDC input report, such as a USB- or BLUETOOTH-compliant input report. Furthermore, in some examples, the source device may receive the one or more IP packets over a wireless communication network. The source device may identify, based on data in the one or more IP packets, one of the preconfigured report formats. The source device may parse the HIDC input report based on the identified preconfigured report format in order to determine a user input. The source device may then generate media data in response to the user input and send the media data from the source device to the sink device.

FIG. 1 is a block diagram illustrating an example of a Wireless Display (WD) system 10 in which one or more techniques of this disclosure may be implemented. FIG. 1 and the following figures are provided for purposes of explanation and should not be considered limiting of the techniques as broadly exemplified and described in this disclosure.

In the example of FIG. 1, WD system 10 may include a source device 20 and a sink device 60. Source device 20 may communicate with sink device 60 via a wireless channel 50. In the example of FIG. 1, source device 20 includes at least one application 22, an operating system (OS) 24, a transmitter/receiver (TX/RX) unit 26, a plurality of report formats 28, a WD session manager 30, and a User Input Back Channel (UIBC) module 32. OS 24 of source device 20 may include an IP stack 34. Sink device 60 may include a transmitter/receiver unit (TX/RX) 62, a media decoder 64, at least one output device 66, a WD session manager 68, at least one human input device (HID) 70, at least one HID driver 72, a UIBC module 74, and an operating system (OS) 76. OS 76 may include an IP stack 78. The illustrated components constitute merely one example configuration of WD system 10. Other configurations may include fewer components than those illustrated or may include components in addition to than those illustrated. For example, source device 20 may include one or more output devices, such as displays and speakers.

The components of source device 20 and sink device 60 may be implemented in various ways. For example, one or more components of source device 20 and sink device 60 may be implemented as one or more microprocessors, digital signal processors (DSPs), application specific integrated circuits (ASICs), field programmable gate arrays (FPGAs), discrete logic, software, hardware, firmware or any combinations thereof. In examples where one or more aspects are implemented in software, underlying hardware (e.g., in the form of a programmable processor) may execute the software. Thus, each of source device 20 and sink device 60 may comprise specialized machines configured to execute one or more of the techniques of this disclosure.

Operating system 24 may manage computer hardware of source device 20 and may provide common services for computer programs that run on source device 20. Similarly, operating system 76 may manage computer hardware of sink device 60 and may provide common services for computer programs that run on sink device 60. In some examples, OS 24 and/or OS 76 may comprise ANDROID™ operating systems, WINDOWS™ operating systems, IOS™ operating systems, or other brands of operating systems.

WD session manager 30 and WD session manager 68 may comprise one or more computer programs that run on source device 20 and sink device 60, respectively. WD session manager 30 and WD session manager 68 may use services provided by OS 24 and OS 76, respectively, to establish a WD session over wireless channel 50. When WD session manager 30 and WD session manager 68 establish a WD session, WD session manager 30 and WD session manager 68 may perform a capability negotiation using, for example, Real-Time Streaming Protocol (RTSP) control messages. In one example, a request to establish a WD session may be sent by WD session manager 30 to sink device 60. Once the WD session is established, source device 20 may transmit media data, e.g., audio/video (AV) data, to sink device 60. Source device 20 may transmit media data to sink device 60, for example, using the Real-time Transport Protocol (RTP). Sink device 60 may render the received media data on its display and audio equipment.

UIBC module 32 and UIBC module 74 may comprise computer programs that run on source device 20 and sink device 60, respectively. UIBC module 32 and UIBC module 74 may use services provided by OS 24 and OS 76, respectively, to send UIBC messages from sink device 60 to source device 20. The UIBC messages may include generic input messages and/or HIDC input reports.

Application 22 may comprise one or more computer programs that run on source device 20. Application 22 may output encoded media data. The media data may include audio data and/or video data. In some examples, source device 20 may capture the media data in real-time via a camera and/or microphone of source device 20. In other examples, the media data may be pre-recorded media data such as movies, television shows, or music. In some instances, media data may include pictures that are a combination of different types of content, such as a picture of a movie or TV program that has user input options overlaid on the picture. In some examples, application 22 may re-encode already encoded media data. In other words, application 22 may transcode media data.

Application 22 may instruct OS 24 to transmit the encoded media data to sink device 60. OS 24 may use TX/RX unit 26 to transmit the encoded media data over wireless channel 50 to sink device 60. TX/RX unit 62 of sink device 60 may receive the encoded media data. Media decoder 64 may decode the encoded media data and output the decoded media data for presentation on output device 66.

Application 22 and media decoder 64 may include encoder/decoder (CODEC) units that implement various audio and video compression standards, such as the ITU-T H.264 standard, alternatively referred to as MPEG-4, Part 10, Advanced Video Coding (AVC), or the newly emerging high efficiency video coding (HEVC) standard. Many other types of proprietary or standardized compression techniques may also be used. Generally speaking, media decoder 64 may be configured to perform the reciprocal coding operations of a media encoder used in application 22. Although not shown in FIG. 1, in some aspects, application 22 and media decoder 64 may each be integrated with an audio encoder and decoder, and may include appropriate MUX-DEMUX units, or other hardware and software, to handle encoding of both audio and video in a common data stream or separate data streams. If applicable, such MUX-DEMUX units may conform to the ITU H.223 multiplexer protocol, or other protocols such as the user datagram protocol (UDP).

Output device 66 may comprise any of a variety of video output devices such as a cathode ray tube (CRT) display, a liquid crystal display (LCD), a plasma display, a light emitting diode (LED) display, an organic light emitting diode (OLED) display, or another type of display device. In these or other examples, output device 66 may be an emissive display or a transmissive display. Output device 66 may also include a touch display such that output device 66 is simultaneously both an input device and a display device. Such touch displays may be capacitive, resistive, or other types of touch panels that allow users to provide user input. Alternatively, output device 66 may comprise any of a variety of audio output devices such as headphones, single-speaker systems, multi-speaker systems, or surround sound systems.

Although output device 66 is shown as part of sink device 60, sink device 60 may be a system of devices. As one example, output device 66 may be a television and sink device 60 may be an external box connected, either wired or wirelessly, to output device 66. In other examples, sink device 60 may be a single device, such as a tablet computer or smartphone. In still other cases, source device 20 and sink device 60 are similar devices, e.g., both being smartphones, tablet computers, or the like. In this case, one device may operate as the source and the other may operate as the sink. These roles may be reversed in subsequent communication sessions. In still other cases, source device 20 may comprise a mobile device, such as a smartphone, laptop or tablet computer, and sink device 60 may comprise a more stationary device (e.g., with an AC power cord), in which case source device 20 may deliver audio and video data for presentation to one or more viewers via sink device 60.

TX/RX unit 32 and TX/RX unit 62 may each include various mixers, filters, amplifiers and other components designed for signal modulation, as well as one or more antennas and other components designed for transmitting and receiving data. Wireless channel 50 may represent any suitable communication medium, or collection of different communication media, for transmitting audio/video data, control data and feedback between source device 20 and sink device 60. Wireless channel 50 may comprise a wireless communication network. Wireless channel 50 may be a relatively short-range communication channel, and may implement a physical channel structure similar to WI-FI, BLUETOOTH, or the like, that are implemented using 2.4, GHz, 3.6 GHz, 5 GHz, 60 GHz or Ultrawideband (UWB) frequency band structures. However, wireless channel 50 is not necessarily limited in this respect, and may comprise any wireless communication medium, such as any radio frequency (RF) spectrum, or any combination of wireless and wired media. In other examples, wireless channel 50 may form part of a packet-based network, such as a wired or wireless local area network, a wide-area network, or a global network such as the Internet. Additionally, wireless channel 50 may be used by source device 20 and sink device 60 to create a peer-to-peer link.

Source device 20 and sink device 60 may communicate over wireless channel 50 using a communications protocol such as a standard from the IEEE 802.11 family of standards.

In one example, wireless channel 50 may be a network communication channel. In this example, a communication service provider may centrally operate and administer the network using a base station as a network hub. Source device 20 and sink device 60 may, for example, communicate according to the Wi-Fi Direct or Wi-Fi Display (WFD) standards, such that source device 20 and sink device 60 communicate directly with one another without the use of an intermediary such as a wireless access point or a so-called hotspot. Relatively short distance in this context may refer to, for example, less than approximately seventy meters, although in a noisy or obstructed environment, the distance between devices may be even shorter, such as less than approximately thirty-five meters, or less than approximately twenty meters.

The techniques of this disclosure may at times be described with respect to WFD, but it is contemplated that aspects of these techniques may also be compatible with other communication protocols. By way of example and not limitation, the wireless communication between source device 20 and sink device 60 may utilize orthogonal frequency division multiplexing (OFDM) techniques. A wide variety of other wireless communication techniques may also be used, including but not limited to time division multiple access (TDMA), frequency division multiple access (FDMA), code division multiple access (CDMA), or any combination of OFDM, FDMA, TDMA and/or CDMA.

As illustrated in the example of FIG. 1, sink device 60 may be operationally coupled to at least one HID 70. Example types of HIDs may include, but are not limited to, keyboards, mice, joysticks, touchscreens, trackballs, touch-sensitive surfaces, keypads, buttons, video game controllers, remote controls, digital pens or styluses, gesture-responsive input devices or cameras, and other types of devices that a human can use to provide user input to a computer. HID 70 may be associated with HID driver 72. When a human uses HID 70 to provide user input, HID driver 72 may receive signals from HID 70 and may generate an input report. The input report may describe the input received by HID 70. For example, if HID 70 is a mouse, the input report may indicate that the mouse was moved five positions left and ten positions up. In some examples, the input report generated by HID driver 72 conforms to a USB or BLUETOOTH standard.

When HID driver 72 generates an input report, HID driver 72 may provide the input report to OS 76 of sink device 60. In response to receiving the input report, OS 76 may identify a computer program that has registered with OS 76 to receive input events associated with HID 70. OS 76 may then provide an input event to the identified computer program. The input event may be a data object (e.g., an object-oriented programming language object) that includes data that describes the user input received by HID 70. In some examples, the input event may include a generic input message that OS 76 generates based on the input report generated by HID driver 72. In other examples, the input event may include a HIDC input report that matches the input report generated by HID driver 72.

In a non-WD system, the identified computer program may process the input event and, based on the user input described by the input event, output data at output device 66. However, in WD system 10, sink device 60 may be not responsible for processing input reports. Rather, source device 20 may be responsible for processing input reports.

Accordingly, UIBC module 74 may register with OS 76 to receive input events associated with HID 70. When UIBC module 74 receives an input event from OS 76, UIBC module 74 may generate a UIBC message that contains an input message that is based on the input event. UIBC module 74 may then use one or more services provided by OS 76 to send the UIBC message from sink device 60 to source device 20 over wireless channel 50. In some examples, IP stack 78 of OS 76 may package the UIBC message into one or more IP packets for transmission to source device 20 via wireless channel 50. In this way, sink device 60 may receive an indication of user input from HID 70. In response to receiving the indication of the user input, HID driver 72 may generate, based on the user input, an input report that conforms to a report format. Sink device 60 may send IP packets to source device 20 over wireless channel 50. The IP packets may contain an input message based on the input report.

When TX/RX unit 26 of source device 20 receives the one or more IP packets containing the UIBC message, TX/RX unit 26 may provide the one or more IP packets to OS 24 of source device 20. IP stack 34 of OS 24 may then extract the UIBC message from the one or more IP packets. OS 24 may then identify (e.g., based on a port number specified by the one or more IP packets) a process running on source device 20 that has registered to receive UIBC messages. In the example of FIG. 1, UIBC module 32 has registered to receive UIBC messages. Accordingly, OS 24 may provide the UIBC message to UIBC module 32.

Upon receiving the UIBC message, UIBC module 32 may parse the UIBC message to determine the content of the UIBC message. If the UIBC message includes an input message, UIBC module 32 may parse the input message and generate an input event based on the input message. The input event may comprise a data object (e.g., an object-oriented programming language object) that specifies data that is based on the input message. When UIBC module 32 generates the input event, OS 24 may identify one or more processes running on source device 20 that have registered to receive the input event. OS 24 may then provide the input event to the identified processes. The example of FIG. 1 assumes that application 22 has registered to receive the input event.

In response to receiving the input event, application 22 may generate media data based at least in part on the user input described by the input message specified by the input event. For example, if the user input indicates that a click event occurred at the onscreen location of a particular on-screen control, application 22 may perform a function associated with the on-screen control and generate corresponding media data. Application 22 may encode the media data and then instruct OS 24 to send the encoded media data to sink device 60. In some examples, IP stack 34 of OS 24 may encapsulate the encoded media data in a series of one or more IP packets for transmission to sink device 60. In this way, sink device 60 may receive media data from source device 20, where the media data is based on the user input. Sink device 60 may then render the media data for presentation (e.g., display and/or audio playback) at output device 66.

Sink device 60 may send generic input messages and HID command (HIDC) input reports over the UIBC to source device 20. Some HID drivers at sink device 60 may provide input reports to OS 76 when the HID drivers receive indications of user input from HIDs. The input reports may describe the user input received by the HIDs. In some examples, the input reports may conform to USB or BLUETOOTH HID standards. OS 76 of sink device 60 may generate generic input messages in response to some input reports received by OS 76 from HID drivers. OS 76 may then provide to UIBC module 74 input events that specify the generic input messages. When UIBC module 74 receives a generic input message, UIBC module 74 may generate a UIBC message that contains the generic input message and may enqueue the UIBC message for transmission to source device 20.

OS 76 may generate generic input messages such that generic input messages that describe user input received by HIDs in different classes of HIDs have different report formats, but generic input messages that describe user input received from different HIDs within a class of HIDs have the same report format. For example, OS 76 may use a first report format to generate generic input messages that describe user input received by various types of mice. In this example, OS 76 may use a second report format to generate generic input messages that describe user input received by various types of game controllers.

By generating generic input messages, OS 76 may be able to harmonize the input reports associated with different HIDs that belong to the same class of HIDs. For example, OS 76 may be able to convert various types of mouse input reports into a format that is generic to most types of mice. For example, a driver for a first brand of mouse may use a $4^{th}$ byte of an input report to indicate whether a scroll wheel was moved forward or back and a driver for a second brand of mouse may not use a $4^{th}$ byte of an input report at all. In this example, OS 76 may convert the input reports from the drivers for the first and second brands of mice into generic input messages in which the $4^{th}$ byte indicates whether a scroll wheel was moved, which would be always zero for the mouse without a scroll wheel. In this example, it may be sufficient for sink device 60 to indicate to source device 20 that an input report is from a mouse in order for source device 20 to be able to interpret such generic input messages.

However, it may not be desirable to limit WD system 10 to only using common types of HIDs. Rather, it may be desirable to allow source device 20 and sink device 60 to be able to support a wide variety of HIDs, even HIDs that belong to the same general class of HIDs. For example, two different video game controllers may have different numbers of buttons. Accordingly, in this example, it may not be possible to have input reports from these two video game controllers have the same format. New HIDs may also emerge, and it may be desirable to have flexibility for source device 20 and sink device 60 to support new or emerging HIDs.

Accordingly, some HID drivers at sink device 60 may provide input reports directly to UIBC module 74 or OS 76 may provide input reports from HID drivers directly to UIBC module 74. The input reports may conform to a USB or BLUETOOTH standard. In response to receiving an input report from a HID driver, UIBC module 74 may generate a UIBC message that contains an input message based on the input report. UIBC module 74 may then enqueue the UIBC message for transmission to source device 20. When UIBC module 74 generates a UIBC message in this way, the UIBC message is said in this disclosure to contain a HIDC input report. In this way, sink device 60 may send input reports as USB or BLUETOOTH HID input reports over IP packets to source device 20.

For example, different types of HIDs may provide different types of inputs. Accordingly, drivers for different types of HIDs can generate different types of input reports. Moreover, different drivers for HIDs belonging to the same class of HIDs can generate differently formatted input reports. For example, a driver for a first brand of joystick may use a 32nd bit of an input report to indicate whether a primary joystick button was pushed and a driver for a second brand of joystick may use a 16th bit of an input report to indicate whether a primary joystick button was pushed.

Sink device 60 may generate HIDC input reports for user input received over various input paths. In some examples, such input paths may include infrared, USB, BLUETOOTH, ZIGBEE, WI-FI, and vendor-specific input paths. In some examples, HIDC input reports may be limited to mouse and keyboard inputs. In other examples, HIDC input reports may be generated for other types of HIDs, such as single touch touchscreens, multitouch touchscreens, joysticks, cameras, gesture detection systems, remote controls, infrared device, and/or vendor-specific types of HIDs. In some examples, HIDC input reports may be not be specified in RTSP. The user inputs of a vendor-specific category may be in a vendor-specific HID format. Sink device 60 and source device 20 may have a common vendor-specific user input interface that is not specified by any device platform, nor standardized in an interpreted user input category. In that case, sink device 60 may send HIDC input reports in a format specified by a vendor library. When source device 20 receives such vendor-specific user inputs, source device 20 may invoke the vendor-specific HID user input library to parse such user inputs.

As mentioned above, UIBC module 32 may receive UIBC messages that include input messages, parse the input messages to determine the user input described by the input messages, and generate input events based on the user input described by the input messages. In order to parse a HIDC input report, UIBC module 32 may need to determine the report format to which the HIDC input report conforms. Hence, in accordance with the techniques of this disclosure, UIBC module 32 may determine the report format of a HIDC input report in a UIBC message based on data in the one or more IP packets that contain the HIDC input report.

In some examples, source device 20 may store report formats 28. In some examples, source device 20 may store report formats 28 prior to establishing a UIBC with sink device 60. Report formats 28 may include data that describe report formats associated with particular HIDs. For example, report formats 28 may include schemas (e.g., extensible markup language (XML) schemas, etc.) that describe report formats associated with particular HIDs. In such examples, the report descriptors specified in the IP packets may be identifiers that source device 20 associates with particular ones of report formats 28. To parse a HIDC input report, UIBC module 32 may use such identifiers to select one of report formats 28. Source device 20 may then use the report format described by the identified schema to parse the HIDC input report. In this way, sink device 60 and source device 20 may exchange a simplified subset of the data than may be exchanged using a conventional USB or BLUETOOTH negotiation method. Thus, sink device 60 and source device 20 may not need to exchange schemas indicating formats for HIDC input reports regarding input from particular HIDs.

UIBC module 32 may identify one of report formats 28 based on various identifiers. For example, a UIBC message may include at least a first field and a second field. The first field may include a HIDC input report. The second field may include a HID type indicator. The HID type indicator may comprise a numerical identifier that identifies one of report formats 28. In another example, the one or more IP packets may specify an IP address of sink device 60. In this example, UIBC module 32 may identify one of report formats 28 based at least in part on the IP address of sink device 60. Furthermore, the one or more IP packets may specify a source port. In this example, UIBC module 32 may identify one of report formats 28 based at least in part on the IP address of sink device 60 and the source port.

In other examples, UIBC module 74 may generate HIDC input reports that contain report descriptors or report data. The report descriptor of a HIDC input report may describe report formats of the report data. In some examples, the report descriptor may include a schema. For example, the report descriptor may indicate that the 32nd bit of the report data indicates whether a particular button of a HID was pushed. The report data of a HIDC input report may describe user input received by a HID.

In such examples, UIBC module 32 may, in response to receiving a UIBC message that contains a HIDC input report, determine whether the HIDC input report contains a report descriptor or a report data. If the HIDC input report contains a report descriptor, UIBC module 32 may store the report descriptor for later use in parsing HIDC input reports. If the HIDC input report contains report data, UIBC module 32 may parse the report data based on a previously-received report descriptor.

Furthermore, HIDC input reports may contain usage flags and HIDC values. The usage flag of a HIDC input report indicates whether the HIDC value of the HIDC input report contains format data or report data. In some such examples, the HIDC input report may conform to the format indicated below in Table 1.

TABLE 1

Example format of HIDC input report

| Field | Size (Octet) | Value |
| --- | --- | --- |
| HID Interface Type | 1 | HID Interface Type. |
| HID Type | 1 | HID Type. |
| Usage | 1 | Signals the usage of the HIDC value field in this instance. Set to 0 for HID report data. Set to 1 for HID report descriptor. Other values are reserved. |
| Length | 2 | Length of the HIDC value in octets. |
| HIDC value | Variable | HID report data or HID report descriptor. The function of them may be defined in a HID specification, such as those for USB or BLUETOOTH. |

In the example HIDC input report format of Table 1, the "usage" flag of a HIDC input report may indicate whether the "HIDC value" field of the HIDC input report includes report data or a report descriptor. The report data may describe user input received by a HID, such as HID 70. The report descriptor may describe a report format. Thus, sink device 60 may send, and source device 20 may receive, a first and a second HIDC input report. The "usage" flag of the first HIDC input report may indicate that the HIDC value of the first HIDC input report comprises a report descriptor and the "usage" flag of the second HIDC input report may indicate that the HIDC value of the second HIDC input report comprises report data.

In examples where the HIDC input reports conform to the format of Table 1, sink device 60 may send an HIDC input report comprising a report descriptor to source device 20 before sink device 60 sends a HIDC input report comprising report data to source device 20. Sink device 60 may send report descriptors to source device 20 at multiple occasions to ensure that source device 20 has correct formats. UIBC module 32 may save the report descriptors for the duration of a WD session and use the report descriptors for parsing report data.

In other examples, UIBC module 32 may assume that a first HIDC input report received from sink device 60 always specifies a report format and that subsequent HIDC input reports received from sink device 60 are formatted according to the report format described by the first HIDC input report. Furthermore, in some examples, UIBC module 32 may assume that a first HIDC input report received from a particular port of sink device 60 always specifies a report format and that subsequent HIDC input reports received from the particular port of sink device 60 are formatted according to the report format described by the first HIDC input report.

In other examples, each HIDC input report may include two HIDC values. The first HIDC value of an HIDC input report may specify a report descriptor. The second HIDC value of the HIDC input report may specify report data that conforms to a format specified by the report descriptor.

In some examples, sink device 60 and source device 20 may support HIDC input reports, but may not support HIDC output reports. HIDC output reports may convey information from source device 20 to a human input device, such as a keyboard. Furthermore, in some such examples, sink device 60 may send the HIDC input reports to source device 20 on an interrupt basis. Thus, it may not be necessary for source device 20 to poll sink device 60 for HIDC input reports.

Figure 2:
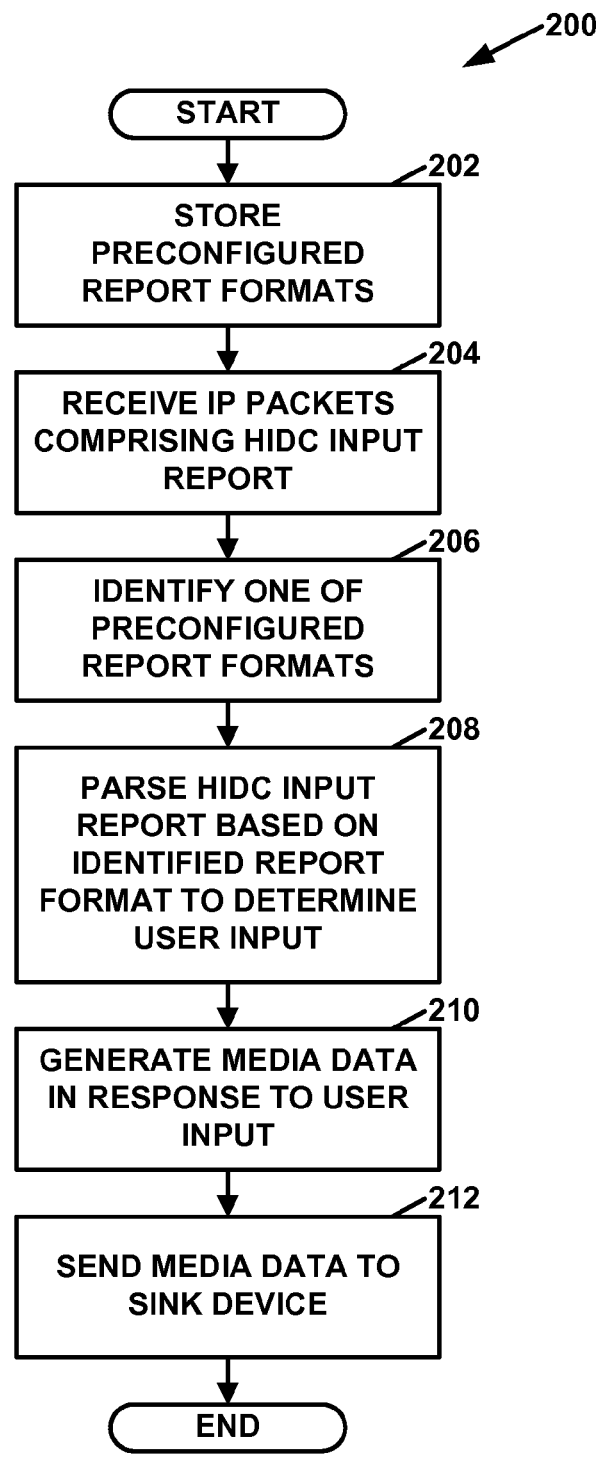
FIG. 2 is a flowchart that illustrates an example operation performed by a source device, in accordance with one or more techniques of this disclosure.

FIG. 2 is a flowchart that illustrates an example operation 200 performed by source device 20, in accordance with one or more techniques of this disclosure. Although FIG. 2 and other figures are described with reference to FIG. 1, FIG. 2 and other figures described herein may be applicable in examples other than the example of FIG. 1.

In the example of FIG. 2, source device 20 may store a plurality of preconfigured report formats 28 (202). Each of preconfigured report formats 28 may be associated with a different type of HID. In addition, source device 20 may receive one or more IP packets from sink device 60 (204). The one or more IP packets may contain a HIDC input report. UIBC module 32 of source device 20 may identify, based on data in the one or more IP packets, a preconfigured report format from the plurality of preconfigured report formats 28 (206). Next, UIBC module 32 may parse the HIDC input report based on the identified preconfigured format in order to determine a user input described by the HIDC input report (208). Source device 20 may generate media data in response to the user input (210). Source device 20 may then send the media data from source device 20 to sink device 60 (212). Upon receiving the media data, sink device 60 may decode and present the media data.

Figure 3:
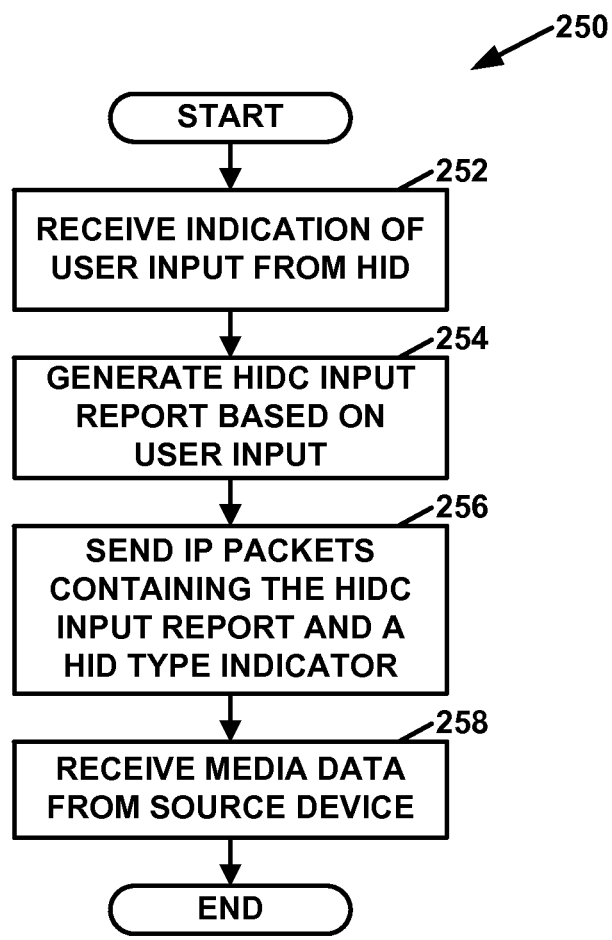
FIG. 3 is a flowchart that illustrates an example operation performed by a sink device, in accordance with one or more techniques of this disclosure.

FIG. 3 is a flowchart that illustrates an example operation 250 performed by a sink device, in accordance with one or more techniques of this disclosure. In the example of FIG. 3, sink device 60 may receive from a HID (e.g., HID 70) an indication of a user input (252). UIBC module 74 at sink device 60 may generate a HIDC input report based on the user input (254). In some examples, the HIDC input report may conform to a USB or a BLUETOOTH standard. Next, sink device 60 may send one or more IP packets to source device 20 (256). The IP packets may contain the HIDC input report and a HID type indicator that identifies a report format for parsing the HIDC input report. Subsequently, sink device 60 may receive media data from source device 20 (258). The media data may be based on the user input described by the HIDC input report.

Figure 4:
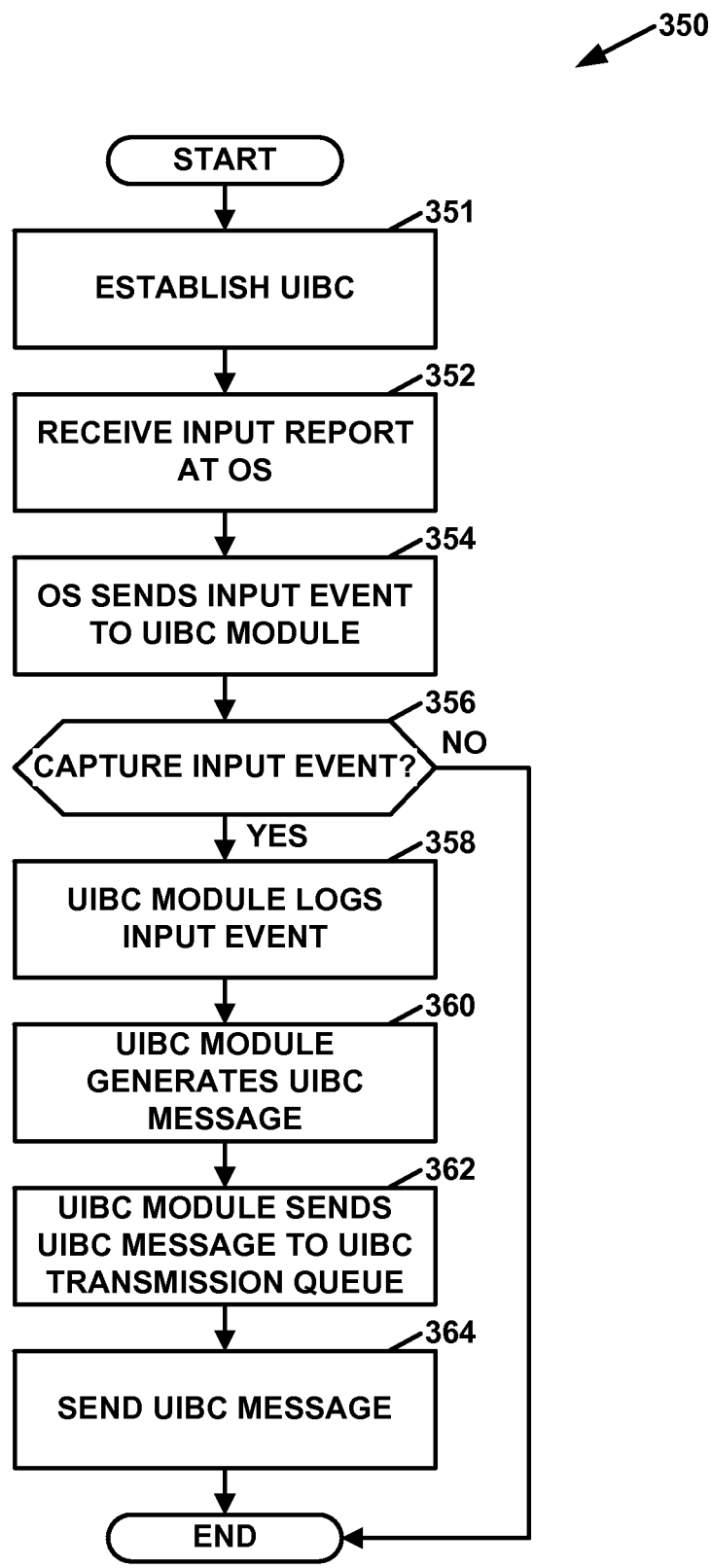
FIG. 4 is a flowchart that illustrates another example operation performed by the sink device, in accordance with one or more techniques of this disclosure.

FIG. 4 is a flowchart that illustrates another example operation 350 performed by sink device 60, in accordance with one or more techniques of this disclosure. Operation 350 may be a more specific case of operation 250 illustrated in the example of FIG. 3.

Figure 7:
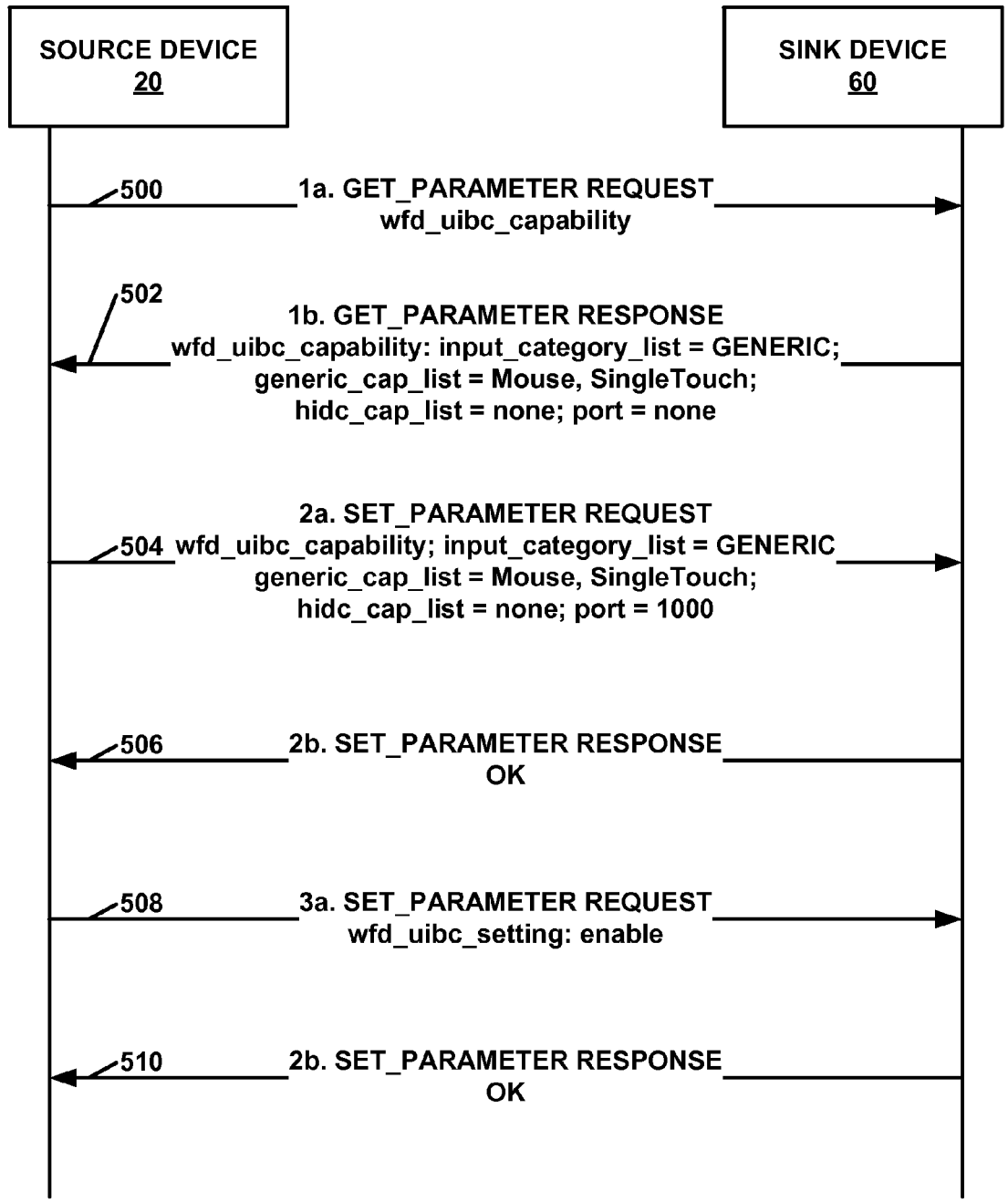
FIG. 7 is a communication diagram that illustrates an example interaction between a source device and a sink device to negotiate a User Input Back Channel (UIBC) for generic input messages.
Figure 8:
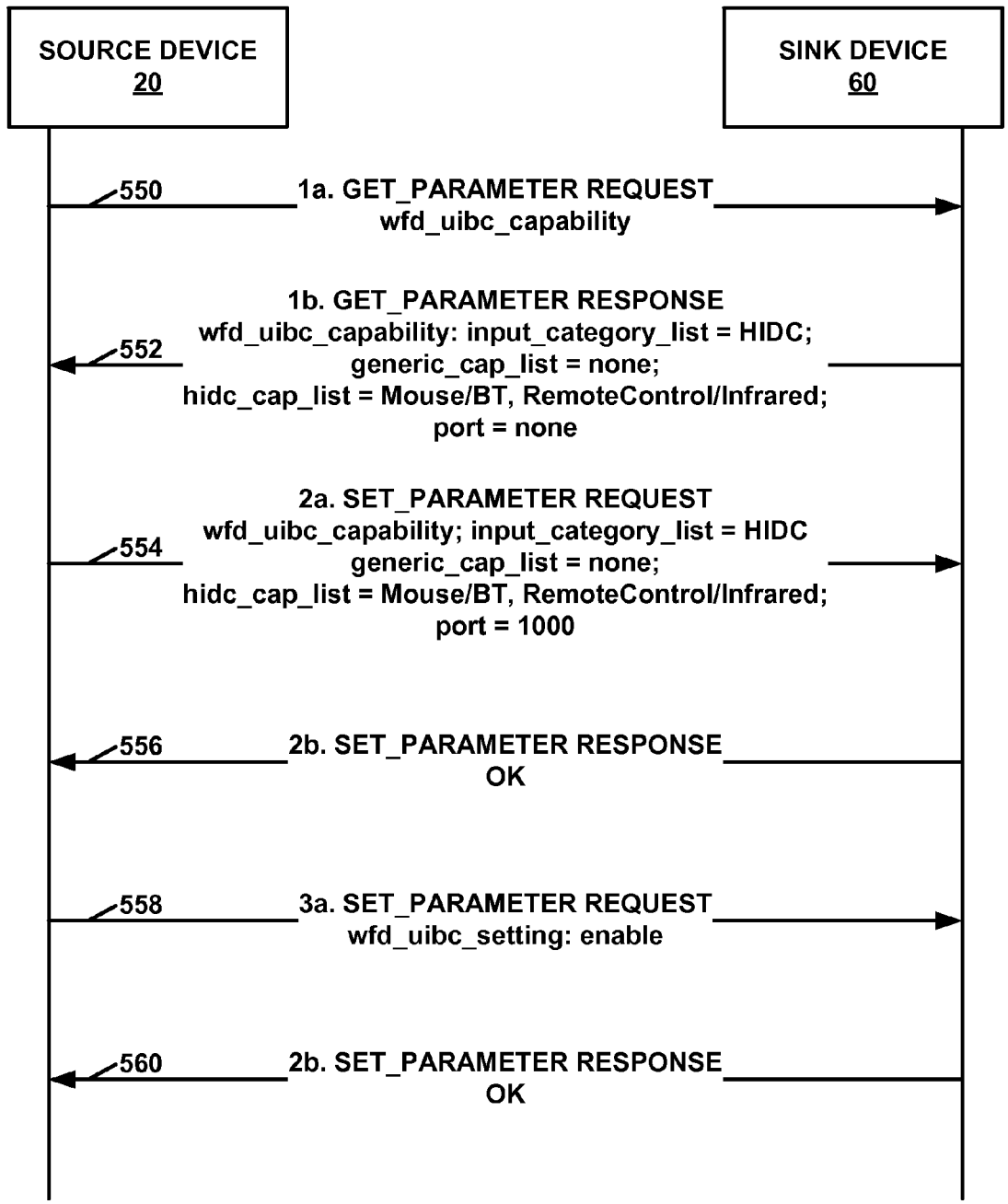
FIG. 8 is a communication diagram that illustrates an example interaction between a source device and a sink device to negotiate a UIBC for Human Input Device Command (HIDC) input reports.

In the example of FIG. 4, WD session manager 68 of sink device 60 communicates with WD session manager 30 of source device 20 to establish a UIBC (351). In some examples, WD session manager 30 of source device 20 initiates the communication to establish the UIBC. In other examples, WD session manager 68 of sink device 60 initiates the communication to establish the UIBC. In some examples, WD session manager 68 and WD session manager 30 may negotiate UIBC capabilities during session establishment. FIG. 7, described below, is a communication diagram that illustrates an example interaction between source device 20 and sink device 60 to negotiate the UIBC for generic input messages. FIG. 8, described in greater detail below, is a communication diagram that illustrates an example interaction between source device 20 and sink device 60 to negotiate the UIBC for HIDC input reports.

Before the UIBC is established, sink device 60 may be aware of and manage the input devices connected to it. Touchscreen and remote control devices may always be connected to sink device 60. Other input devices (such as mice and keyboards) connect and disconnect, potentially requiring appropriate Plug-and-Play (PnP) managers and device drivers. Before initiating the UIBC, WD session manager 68 may have a list of connected devices and their current states. WD session manager 68 may identify HIDs in this list to source device 20 during establishment of the UIBC.

In some examples, establishing the UIBC assumes the following prerequisites: Source device 20 has discovered sink device 60. Sink device 60 has been paired with source device 20. A Transmission Control Protocol (TCP) connection has been established between source device 20 and sink device 60 with a RTSP control port. All WD non-UIBC capabilities have been negotiated via RTSP between source device 20 and sink device 60.

After the UIBC is established, OS 76 of sink device 60 may receive an input report from HID driver 72 (352). In response to receiving the input report, OS 76 may send an input event to UIBC module 74 of sink device 60 (354). The input event may include the input report received by OS 76. When UIBC module 74 receives input events, UIBC module 74 may store the input events in a queue. UIBC module 74 may process the input events in the order that UIBC module 74 adds the input events to the queue.

When UIBC module 74 processes an input event, UIBC module 74 may determine whether to capture the input event (356). UIBC module 74 may make the determination whether to capture the input event in various ways. For example, UIBC module 74 may make the determination not to capture input events for key presses of a shift key or control key. If UIBC module 74 makes the determination not to capture the input event ("NO" of 356), operation 350 may end.

If UIBC module 74 makes the determination to capture the input event ("YES" of 356), UIBC module 74 may log the input event (358). UIBC module 74 may log the input event in various ways. For example, UIBC module 74 may log the input event on a UIBC test command line interface (CLI) for debugging.

In addition, UIBC module 74 may generate a UIBC message (360). The UIBC message may have various message formats. FIG. 6, described in detail below, illustrates an example message format for a UIBC message. In other examples, the message format of a UIBC message may be simpler than the example message format of FIG. 6. For instance, in such other examples, a UIBC message may only include input body. The UIBC message may include a generic input body or a HIDC input body. In some examples, the UIBC message includes a report descriptor that identifies a report format to which the HIDC input body of the UIBC message conforms. When UIBC module 74 processes an input report, UIBC module 74 may generate a UIBC message that includes a generic input body (i.e., a generic input message) or a HIDC input body (i.e., a HIDC input report).

UIBC module 74 may generate UIBC messages that include generic input bodies for user inputs that are device platform dependent. For example, different device platforms, such as WINDOWS MOBILE™ and ANDROID™, may have different formats of user inputs. The user inputs may be detected and sent as operating system-level user inputs, not as driver-level user inputs.

When UIBC module 32 of source device 20 receives a generic input message, UIBC module 32 may process the generic input message according to a device platform of source device 20. Hence, generic input messages may be useful when source device 20 is capable of processing the original input reports received by UIBC module 74. For example, source device 20 may process a certain sequence of finger touches on a touchscreen, since an application running at source device 20 (e.g., application 22) may handle complex user interactions. Source device 20 may support multi-touch motion events for generic inputs with the use of a pointer identifier that identifies which pointers are being used at once. Therefore, sink device 60 may send these multi-touch motion events as multiple pointers, and source device 20 may interpret these as multiple pointer events.

In some examples, UIBC module 74 may listen for motion events generated by OS 76. In such examples, UIBC module 74 may generate a UIBC message that includes a generic input body in response to receiving a motion event. The motion event may be a data object (e.g., object-oriented programming language object) that belongs to an Input Event class. Objects belonging to the Input Event class may comprise Motion Event objects or Key Event objects. Motion Event objects may include data that record movements from various types of HIDs, such as mice, pens, fingers, and trackballs. Key Event objects may include data that record key presses. In such examples, UIBC module 74 may process the Motion Event objects according to the following pseudo code:

```
If KeyEvent
   If KeyDown
      Save Key Code 1 (If Shift, wait 1 sec and Save Key Code 2)
      Translate to ASCII
      Generate KeyDown Generic Input Message
      Place in InputTx Queue
   If KeyUp
      Save Key Code 1(If Shift, wait 1 sec and Save Key Code 2)
      Translate to ASCII
      Generate KeyUp Generic Input Message
      Place in InputTx Queue
Else If MotionEvent
   If ActionDown
      Save X, Y and ID for each Pointer Down
      Scale X, Y to Video Resolution
      Generate TouchDown Generic Input Message
      Place in InputTx Queue
   If ActionUp
      Save X, Y and ID for each Pointer Up
      Scale X, Y to Video Resolution
      Generate TouchUp Generic Input Message
      Place in InputTx Queue
   If ActionMove && Absolute InputDevice
      Save Primary X, Y and ID for each Pointer
      Scale X, Y to Video Resolution
      Generate TouchMove Generic Input Message
      Place in InputTx Queue
   If ActionMove && Relative InputDevice
      Save Delta X, Y, and Get Absolute X, Y
      Scale X, Y to Video Resolution
      Generate TouchMove Generic Input Message
      Place in InputTx Queue
   If ActionScroll
      If Vertical
         Generate Vertical Scroll Report
         Place in InputTx Queue
```

-continued
```
      If Horizontal
         Generate Horizontal Scroll Report
         Place in InputTx Queue
      Else Print "InputEvent cannot be Processed: " + Command
```

In accordance with the pseudo code provided above, UIBC module 74 may determine whether the Motion Event object is a Key Event object. If the Motion Event object is a Key Event object and the Key Event object indicates a key down event, UIBC module 74 may translate a code for the pressed key to an UTF-8 or ASCII code, generate a generic input message for the key down event, and enqueue a UIBC message containing the generic input message for transmission. If the Motion Event object is a Key Event object and the Key Event object indicates a key up event, UIBC module 74 may translate a code for the released key to an UTF-8 or ASCII code, generate a generic input message for the key up event, and enqueue a UIBC message containing the generic input message for transmission. In the pseudo code provided above, UIBC module 74 may generate and enqueue for transmission generic input messages for various types of Motion Event objects, such as pointer down events, pointer up events, pointer move events, and scroll events.

In addition to processing Motion Event objects and Key Event objects as discussed above, UIBC module 74 may process other types of input events. For example, if sink device 60 includes orientation detectors, UIBC module 74 may generate generic input messages that indicate changes in the orientation of sink device 60, as indicated by the following pseudo code.

```
If Orientation Change Detected
   On Orientation Change
      Save Orientation Degrees
      Generate Rotation Input Message
      Place in InputTx Queue
```

In some examples, UIBC module 74 may generate generic input messages for multi-touch input. If both source device 20 and sink device 60 support multi-touch, UIBC module 74 may generate additional information elements (IE) for user inputs for Pointer Down, Pointer Move, and Pointer Up with X and Y coordinates preceded by the number of pointers and an index parameter to identify which of multiple pointers it is (e.g. [2, 1, X1, Y1, 2, X2, Y2]). For single touch, these preceding values may be 1 and 1 (e.g. [1,1,X,Y]).

In this disclosure, HIDC may refer to sending messages using a variety of existing HID standards, both based on the USB HID and otherwise. Sink device 60 may forward the user inputs of the HIDC category and may not process the user inputs. It may be possible that a third device connected to sink device 60 is aware of source device 20. In this case, a HID device may send messages from the third device to sink device 60 and sink device 60 may forward the messages directly to source device 20. In this way, source device 20 may respond to those messages in the right context.

In some examples, UIBC module 74 may generate UIBC messages that include HIDC input bodies for USB Key type devices. In some such examples, UIBC module 74 may capture user inputs as Motion Event objects from OS 76 rather than from HID driver 72. UIBC module 74 may generate HIDC input reports based on Input Event objects. UIBC module 74 may process Motion Event objects according to following pseudo code:

```
If MotionEvent
   If ActionDown
      Save X, Y
      Generate HID Mouse Button 1 Down Input Report
      Place in InputTx Queue
   If ActionUp
      Save X, Y
      Generate HID Mouse Button 1 Up Report
      Place in InputTx Queue
   If ActionMove && Absolute InputDevice
      Save X, Y
      Generate HID Mouse Move Report
      Place in InputTx Queue
   If ActionMove && Relative InputDevice
      Save Deltas of X, Y from previous ActionMove
      Generate HID Mouse Move Report
      Place in InputTx Queue
   If ActionScroll
      If Vertical
         Generate Mouse Button 3 Report
         Place in InputTx Queue
   Else Print "MotionEvent cannot be Processed: " + Command
```

In accordance with the pseudo code above, UIBC module 74 may generate HIDC input reports that indicate various types of movement inputs. Furthermore, in the example pseudo code above, the Input Event object may be generated from a HID other than a touchscreen. Consequently, the Input Event object may indicate relative deltas of X and Y rather than absolute X and Y, as typically indicated in Input Event objects for user input from touchscreens.

After UIBC module 74 generates a UIBC message, UIBC module 74 may send the UIBC message to a UIBC transmission queue (362). OS 76 of sink device 60 may send UIBC messages from the UIBC transmission queue (364). OS 76 may send UIBC messages from the UIBC transmission queue in the order that UIBC messages were added to the UIBC transmission queue. When OS 76 sends a UIBC message, IP stack 78 may encapsulate the UIBC message in one or more TCP/IP packets that specify as a destination address an IP address of source device 20. The TCP/IP packet may specify as a destination port a port identifier that source device 20 and sink device 60 negotiated when source device 20 and sink device 60 established the wireless display session.

As indicated above, FIG. 4 is merely one example consistent with this disclosure. In other examples, UIBC module 74 may receive the HIDC input report directly from HID driver 72. UIBC module 74 may then add a UIBC wrapper (e.g., generate a UIBC message that includes the HIDC input report) and then send the UIBC message to the UIBC transmission queue.

Figure 5:
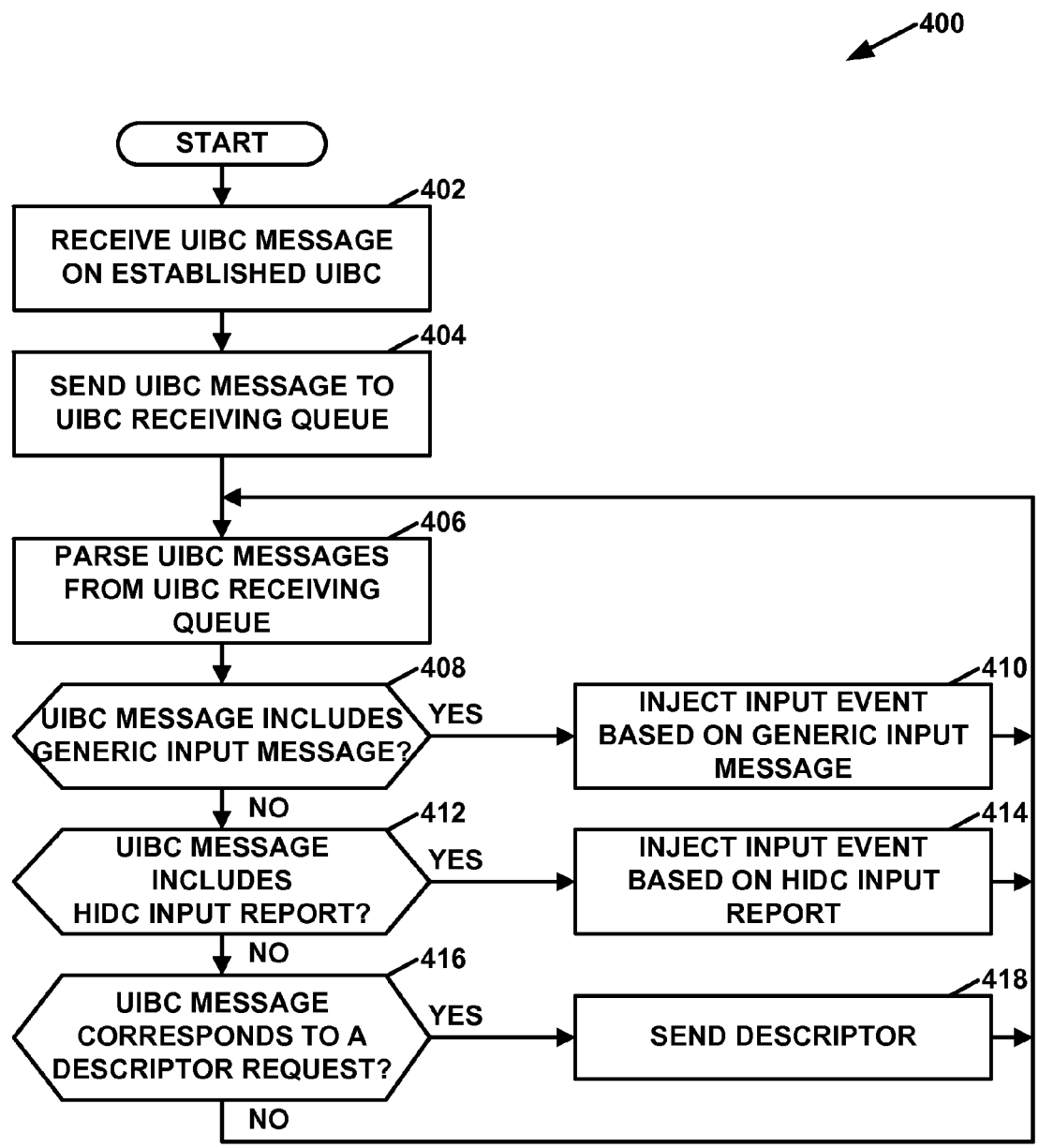
FIG. 5 is a flowchart that illustrates another example operation performed by the source device, in accordance with one or more techniques of this disclosure.

FIG. 5 is a flowchart that illustrates another example operation 400 performed by source device 20. Operation 400 may be a more specific case of operation 200 illustrated in the example of FIG. 2.

In the example of FIG. 5, UIBC module 32 may receive a UIBC message on an established UIBC (402). UIBC module 32 may then send the UIBC message to a UIBC receiving queue (404). UIBC module 32 may parse a UIBC message in the UIBC receiving queue (406). UIBC module 32 may parse UIBC messages in the UIBC receiving queue according to an order that UIBC messages are added to the UIBC receiving queue.

If the UIBC message contains a generic input body, UIBC module 32 may parse the UIBC message according to Table 2, below.

TABLE 2

| Field | Size (octets) | Action |
|---|---|---|
| Generic IE ID (Input Type) | 1 | Set Input Type<br>0 Touch Down<br>1 Touch Up<br>2 Touch Move<br>3 Key Down<br>4 Key Up<br>5 Zoom<br>6 Vertical Scroll<br>7 Horizontal Scroll<br>8 Rotate |
| Length (of Description) | 2 | Verify<br>Touch Down = 6+<br>Touch Up = 6+<br>Touch Move = 6+<br>Key Down = 4<br>Key Up = 4<br>Zoom = 6<br>Vertical Scroll = 2<br>Horizontal Scroll = 2<br>Rotate = 2 |
| Description | Varies | Set Input Values |
| Touch Down | 6+ | #, N, X, Y . . . |
| Touch Up | 6+ | #, N, X, Y . . . |
| Touch Move | 6+ | #, N, X, Y . . . |
| Key Down | 4 | Key1, (2) |
| Key Up | 4 | Key1, (2) |
| Zoom | 6 | Focus X, Y, Int, Fract |
| Vertical Scroll | 2 | −1 or +1 (down/up) |
| Horizontal Scroll | 2 | −1 or +1 (left/right) |
| Rotate | 2 | 0/180 (portrait) 90/270 (landscape) |

Although not shown in Table 2, the body of a generic input message may include the number of pointers actively down (#), with a pointer ID (N) describing each pointer that is down followed by the X and Y coordinates.

If the UIBC message contains a HIDC input report, UIBC module 32 may identify, based on a data (e.g., a HID type indicator) in one or more IP packets that contain the UIBC message, a preconfigured report format. UIBC module 32 may then parse a HIDC input report based on the identified preconfigured report format to determine a user input. For example, if the UIBC message contains a HIDC input report, UIBC module 32 may parse the HIDC input report according to Table 3, shown below. Table 3 indicates an example format for a HIDC input report for mouse actions. In some examples, sink device 60 may send HIDC input reports for mouse actions every 10 ms during mouse actions.

TABLE 3

| Field | Size (octets) | Value |
|---|---|---|
| HID Interface Type - USB | 1 | Verify = 1 |
| HID Type - Mouse | 1 | Verify = 1 |
| Length (of HID Value) | 2 | Verify Size<br>No Scroll = 3<br>Scroll = 4 |
| HID Value (Input Report) | Varies | Set Input Values |
| Buttons | 1 | 0000 0001 |
| 1—Left Click Down | (bit 0) | 0000 0010 |
| 2—Right Click Down | (bit 1) | 0000 0100 |
| 3—Wheel Click Down | (bit 2) | |
| Vertical Move (X) | 1 | + = # Pixels Right (0000 0001)<br>− = # Pixels Left (1111 1111) |
| | 1 | + = # Pixels Down |

TABLE 3-continued

| Field | Size (octets) | Value |
|---|---|---|
| Horizontal Move (Y) | | (0000 0001)<br>– = # Pixels Up<br>(1111 1111) |
| Scroll (Optional) | 1 | + = Scroll Up<br>(0000 0001)<br>– = Scroll Down<br>(1111 1111) |

BLUETOOTH devices may have a similar input report as the example input report of Table 3, except input reports for such BLUETOOTH devices may include an additional DATA header having a value equal to 1010 0001.

After parsing the UIBC message, UIBC module 32 may determine whether the UIBC message includes a generic input message (408). In response to determining that the UIBC message includes a generic input message ("YES" of 408), UIBC module 32 may inject an input event based on the generic input message (410). When UIBC module 32 injects the input event, OS 24 of source device 20 may notify processes that have registered to receive the input event.

In some examples, UIBC module 32 may perform additional processing on values in a generic input event to generate the input event. Without such additional processing, the values represented in the input event may not correlate with appropriate values at source device 20. For example, the UIBC message may include a generic input message that indicates a motion input. In this example, UIBC module 32 may perform additional processing to normalize the X and Y values sent in the generic input message. Because the negotiated video resolution may not match the video resolution of a screen of sink device 60 and a screen of source device 20, the X and Y values of a detected motion event at sink device 60 may not correlate with the negotiated video resolution. Hence, UIBC module 32 may normalize the X and Y values of a motion event detected at sink device 60 to the proper X and Y values of the negotiated video resolution. UIBC module 32 may normalize the X and Y values using the following formula:

Generic Input $X$=Sink $X$*(Max $X$ of Video Resolution/Sink Screen Max $X$)

Generic Input $Y$=Sink $Y$*(Max $Y$ of Video Resolution/Sink Screen Max $Y$)

The negotiated resolution may be specified in the parameter "wfd_video_formats" during the RTSP transaction-based capability negotiation. UIBC module 32 may not perform the mapping if the negotiated resolution matches the resolution of the screen of source device 20.

Furthermore, in the example of the previous paragraph, once UIBC module 32 receives the X and Y values of a generic motion input message, UIBC module 32 may or may not map the X and Y values of the generic motion input message to the resolution of a screen of source device 20 for processing. If source device 20 processes the X and Y values of the generic motion input message on the resolution of the negotiated video, UIBC module 32 does not need to perform any mapping. However, if source device 20 processes the X and Y values of the generic motion input message on the reference of the resolution of a screen of source device 20, UIBC module 32 may perform the following mapping:

$X$ to process=Generic Input $X$*(Sink Screen Max $X$/Max $X$ of Video Resolution)

$Y$ to process=Generic Input $Y$*(Sink Screen Max $Y$/Max $Y$ of Video Resolution)

Moreover, X and Y coordinates specified in generic input events may be absolute coordinates (i.e., screen coordinates) or relative coordinates (i.e., deltas reflecting a change in X and/or Y). In some examples, if the coordinates specified in a generic input event are absolute coordinates, UIBC module 32 may convert the coordinates to relative coordinates, or vice versa, as appropriate for source device 20.

In addition, if the generic input message indicates a key event, an order and number of keys being pressed may be important. Because different operating systems may use different values for keys, UIBC module 74 and UIBC module 32 may use generic UTF-8 or ASCII characters in generic input messages in order to remain operating system agnostic. For instance, to send a capital letter, sink device 60 may wait for another key after the shift key is pressed, and send the appropriate capital letter. In some examples, multiple key codes may be sent in a single generic input message.

If the UIBC message does not include a generic input message ("NO" of 408), UIBC module 32 may determine whether the UIBC message includes a HIDC input report (412). If the UIBC message includes a HIDC input report ("YES" of 412), UIBC module 32 may generate and inject an input event based on the HIDC input report (414). As described elsewhere in this disclosure, sink device 60 may not process HIDC input reports. Rather, sink device 60 may pass HIDC input reports through from HID drivers that generated the HIDC input reports.

In some examples, UIBC module 32 may not need to normalize X and Y coordinates sent in the HIDC input reports because the movements are relative changes in X and Y and only minor increases in mouse movement speed may result. In other examples, UIBC module 32 may normalize X and Y coordinates to reflect differences in screen resolution between a screen of source device 20 and a screen of sink device 60, between a negotiated screen resolution and a screen resolution of sink device 60, or a negotiated screen resolution and a screen resolution of source device 20.

In addition to normalization, the X and Y coordinates sent in HIDC Mouse Input Reports may be relative X and Y coordinates, while Motion Event coordinates can be absolute (screen coordinates) or relative (deltas reflecting a change in X or Y). In some operating systems, most inputs other than touchscreen inputs are relative, so if an additional input device can be found, no changes are needed. Touchscreen input devices may be absolute, so if the input device is a touchscreen, the previous absolute X and Y coordinates may be recorded and only the relative changes may be sent in the HIDC mouse input report.

UIBC module 32 may inject input events in various ways. For example, UIBC module 32 may inject input events via existing drivers. In this example, UIBC module 32 may pass HID values (e.g., values based on the user input described by generic input messages or HIDC input reports) directly to the respective driver on OS 24 and may be processed accordingly. OS 24 may carry the input event from the driver to an application (e.g., application 22) registered to receive the input event.

In another example, UIBC module 32 may inject input events via a HID driver. In this example, UIBC module 32 may pass HID values directly to a HID driver on OS 24. The HID driver may process the HID values accordingly. HID driver requests to OS 24 may also be sent over the UIBC.

In another example, UIBC module 32 may initialize a virtual driver. Initializing a virtual driver may enable UIBC module 32 to have the flexibility to insert a wide variety of input events to OS 24. In this example, UIBC module 32 may pass input events down into the virtual driver. The virtual driver may then send the input events to OS 24 because the virtual driver may be closely integrated with OS 24 and may represent one or multiple input devices. The virtual driver may be initialized when wireless display is active, but may need to be installed.

In another example, UIBC module 32 may inject input events via OS commands to OS 24. In this example, UIBC module 32 may send KeyEvents and MotionEvents directly into OS 24. However, in some examples, OS 24 may prevent the injection of input events via OS comments because it may not be secure for one application to send commands to other applications and each application has its own instance of the underlying kernel. This approach may be easier than implementing a virtual driver and the latency performance may be better. The following pseudo code demonstrates an example way of injecting input events according to this example:

```
InputConnection is = getCurrentInputConnection( );
long eventTime = SystemClock.uptimeMillis( );
ic.sendKeyEvent(new KeyEvent(eventTime, eventTime,
    KeyEvent.ACTION_DOWN, keyEventCode, 0, 0, 0, 0,
    KeyEvent.FLAG_SOFT_KEYBOARD|
    KeyEvent.FLAG_KEEP_TOUCH_MODE));
ic.sendKeyEvent(new KeyEvent(SystemClock.uptimeMillis( ),
eventTime,
    KeyEvent.ACTION_UP, keyEventCode, 0, 0, 0, 0,
    KeyEvent.FLAG_SOFT_KEYBOARD|
    KeyEvent.FLAG_KEEP_TOUCH_MODE));
```

If the UIBC message does not include a HIDC input report ("NO" of 412), UIBC module 32 may determine whether the UIBC message corresponds to a descriptor request (416). In response to determining that the UIBC message corresponds to a descriptor request ("YES" of 416), UIBC module 32 may send a descriptor to a HID host at source device 20 (418). The HID host may be a unit at source device 20 that processes input reports from a particular HID. In the example of FIG. 5, UIBC module 32 may process another UIBC message from the UIBC receiving queue if the UIBC message does not correspond to a descriptor request ("NO" of 416).

During initialization of a HID, a HID host may require additional information about the HID. Accordingly, source device 20 may send a Get_Descriptor command to sink device 60. When sink device 60 receives a Get_Descriptor command, UIBC module 74 may forward the Get_Descriptor command to a HID driver (e.g., HID driver 72) associated with the HID. When the HID driver receives the Get_Descriptor command, the HID driver may send information about the HID to UIBC module 74. UIBC module 74 may then generate and send a UIBC message that includes the information about the HID. In some examples where source device 20 is able to identify a preconfigured report format based on data in the one or more IP packets that contain a HIDC input report, it may be unnecessary for source device 20 to request such additional information.

Upon initialization, sink device 60 may receive a Get_Descriptor command from source device 20 with a Descriptor Type of Report. The HID driver may send the report descriptor as shown below in Tables 4 and 5 as the HID value of the input report. After the initial report descriptor, sink device 60 may continue to send input reports as shown in the HIDC input body as frequently as they are received from the HID driver (or initially via MotionEvents).

TABLE 4

Get Descriptor

| Offset | Field | Size | Value | Description |
|---|---|---|---|---|
| 0 | bmRequestType | 1 | 80h | |
| | 4...0: Recipient | | ...0000 | Device |
| | 6...5: Type | | .00... | Standard |
| | 7: Direction | | 1... | Device-to-Host |
| 1 | bRequest | 1 | 06h | Get Descriptor |
| 2 | wValue.LowByte | 1 | 00h | |
| 3 | wValue.HiByte | 1 | 22h | Report descriptor |
| 4 | wIndex | 2 | 0000h | Interface |
| 6 | wLength | 2 | 0074h | Descriptor Length |

TABLE 5

Interface 0 Report Descriptor for a Mouse

| Item Tag (Value) | Raw Data |
|---|---|
| Usage page (Generic Desktop) | 05 01 |
| Usage (Mouse) | 09 02 |
| Collection (Application) | A1 01 |
| Usage (Pointer) | 09 01 |
| Colllection (Physical) | A1 00 |
| Usage Page (Button) | 05 09 |
| Usage Minimum (Button 1) | 19 01 |
| Usage Maximum (Button 3) | 29 03 |
| Logical Minimum (0) | 15 00 |
| Logical Maximum (1) | 25 01 |
| Report Size (1) | 75 01 |
| Report Count (3) | 95 03 |
| Input | 81 02 |
| (Data, Var, Abs, NWrp, Lin, Pref, NNul, Bit) | |
| Report Size (5) | 75 05 |
| Report Count (1) | 95 01 |
| Input (Cnst, Ary, Abs) | 81 01 |
| Usage Page (Generic Desktop) | 05 01 |
| Usage (X) | 09 30 |
| Usage (Y) | 09 31 |
| Usage (Wheel) | 09 38 |
| Logical Minimum (−127) | 15 81 |
| Logical Maximum (127) | 25 7F |
| Report Size (8) | 75 08 |
| Report Count (8) | 95 03 |
| Input | 81 06 |
| (Data, Var, Rel, NWrp, Lin, Pref, NNul, Bit) | |
| EndCollection | C0 |
| End Collection | C0 |

In some cases, source device 20 may send additional Get_Descriptor commands with descriptor types other than "Report." If sink device 60 receives a Get_Descriptor command with a descriptor type of "HID" (wValue=21 h), the HID driver may send the HID Descriptor as shown in Table 6 below.

TABLE 6

| Offset | Field | Size | Value | Description |
|---|---|---|---|---|
| 0 | bLength | 1 | 09h | |
| 1 | bDescriptorType | 1 | 21h | HID |
| 2 | bcdHID | 2 | 0111h | 1.11 |
| 4 | bCountryCode | 1 | 00h | |
| 5 | bNumDescriptors | 1 | 01h | |
| 6 | bDescriptorType | 1 | 22h | Report |
| 7 | wDescriptorLength | 2 | 0034h | 52 bytes |

If sink device 60 receives a Get_Descriptor(Configuration) command, the HID driver may send the configuration descriptor, the interface descriptor, the HID descriptor, and the endpoint descriptor as separate messages in that order. Examples of these descriptors are described in Tables 7-12, below:

TABLE 7

| Offset | Field | Size | Value | Description |
|---|---|---|---|---|
| 0 | bLength | 1 | 09h | |
| 1 | bDescriptorType | 1 | 02h | Configuration |
| 2 | wTotatLength | 2 | 0022h | |
| 4 | bNumInterfaces | 1 | 01h | |
| 5 | bConfigurationValue | 1 | 01h | |
| 6 | iConfiguration | 1 | 00h | |
| 7 | bmAttributes | 1 | A0h | Bus powered, remote wakeup |
| | 4 . . . 0: Reserved | | . . . 00000 | |
| | 5: Remote wakeup | | . . . 1 . . . | Yes |
| | 6: Self powered | | .0 . . . | No, Bus powered |
| | 7: Reserved (set to one) (bus-powered for 1.0) | | 1 . . . | |
| 8 | bMaxPower | 1 | 32h | 100 mA |

TABLE 8

| Offset | Field | Size | Value | Description |
|---|---|---|---|---|
| 0 | bLength | 1 | 09h | |
| 1 | bDescriptorType | 1 | 04h | Interface |
| 2 | bInterfaceType | 1 | 00h | |
| 3 | BAlternateSetting | 1 | 00h | |
| 4 | bNumEndpoints | 1 | 01h | |
| 5 | bInterfaceClass | 1 | 03h | HID |
| 6 | bInterfaceSubClass | 1 | 01h | Boot interface |
| 7 | bInterfaceProtocol | 1 | 02h | Mouse |
| 8 | iInterface | 1 | 00h | |

TABLE 9

| | HID Descriptor | | | |
|---|---|---|---|---|
| Offset | Field | Size | Value | Description |
| 0 | bLength | 1 | 09h | |
| 1 | bDescriptorType | 1 | 21h | HID |
| 2 | bcdHID | 2 | 0111h | 1.11 |
| 4 | bCountryCode | 1 | 00h | |
| 5 | bNumDescriptors | 1 | 01h | |
| 6 | bDescriptorType | 1 | 22h | Report |
| 7 | wDescriptorLength | 2 | 0034h | 52 bytes |

TABLE 10

| | Endpoint Descriptor | | | |
|---|---|---|---|---|
| Offset | Field | Size | Value | Description |
| 0 | bLength | 1 | 09h | |
| 1 | bDescriptorType | 1 | 05h | Endpoint |
| 2 | bEndpointAddress | 1 | 81h | 1 In |
| 3 | bmAttributes | 1 | 03h | Interrupt |
| | 1 . . . 0: Transfer Type | | . . . 11 | Interrupt |
| | 7 . . . 2: Reserved | | 0000000 . . . | |
| 4 | wMaxPacketSize | 2 | 0005h | 5 bytes |
| 6 | bInterval | 1 | 0Ah | 10 ms |

If a standard HID driver is not used, these requests may be recognized and the UIBC module 74 may store and send the data values above.

TABLE 11

| | Get Descriptor | | | |
|---|---|---|---|---|
| Offset | Field | Size | Value | Description |
| 0 | bmRequestType | 1 | 80h | |
| | 4 . . . 0: Recipient | | . . . 0000 | Device |
| | 6 . . . 5: Type | | .00 . . . | Standard |
| | 7: Direction | | 1 . . . | Device-to-Host |
| 1 | bRequest | 1 | 06h | Get Descriptor |
| 2 | wValue.LowByte | 1 | 00h | |
| 3 | wValue.HiByte | 1 | 01h | Device descriptor |
| 4 | wIndex | 2 | 0000h | |
| 6 | wLength | 2 | 0012h | Descriptor Length |

TABLE 12

| | Device Descriptor | | | |
|---|---|---|---|---|
| Offset | Field | Size | Value | Description |
| 0 | bLength | 1 | 12h | |
| 1 | bDescriptorType | 1 | 01h | Device |
| 2 | bcdUSB | 2 | 0110h | USB Spec 1.1 |
| 4 | bDeviceClass | 1 | 00h | Class info in Ifc Descriptors |
| 5 | bDeviceSubClass | 1 | 00h | |
| 6 | bDeviceProtocol | 1 | 00h | |
| 7 | bMaxPacketSize0 | 1 | 08h | 8 bytes |
| 8 | idVendor | 2 | 08h | Hewlett-Packard |
| 10 | idProduct | 2 | 0024h | |
| 12 | bcdDevice | 2 | 0330h | 3.00 |
| 14 | iManufacturer | 1 | 01h | |
| 16 | iSerialNumber | 1 | 00h | |
| 17 | bNumConfigurations | 1 | 01h | |

FIG. 6 is a conceptual diagram that illustrates an example format of a UIBC message 450. For ease of explanation, the following discussion of FIG. 6 assumes that sink device 60 sends UIBC message 450 and source device 20 receives UIBC message 450.

In the example of FIG. 6, UIBC message 450 may include a version field, a timestamp flag ("T"), a reserved field, an input category field, a timestamp field, a length field, and an input body field. The size of the reserved field may be equal to eight bits and can be ignored by source device 20 (FIG. 1).

The version field may indicate a format version of UIBC message 450. The size of the version field may be equal to three bits. In some examples, the expected value of the version field may be equal to 1.

The input category field may indicate whether the input body field of UIBC message 450 contains a generic input body or a HIDC input body. The size of the input category field may be equal to four bits. In some examples, if a value of the input category field is equal to 0, the input body field of UIBC message 450 may contain a generic input body (i.e., a generic input message). In such examples, if the value of input category field is equal to 1, the input body field of UIBC message 450 may contain a HIDC input body (i.e., a HIDC input report).

The length field may indicate a length in bytes (i.e., octets) of UIBC message 450, including the input body field of UIBC message 450. The size of the length field may be equal to sixteen bits. Source device 20 may use the length field to verify that UIBC message 450 has a proper length.

The timestamp flag may indicate whether source device 20 is to read the timestamp field of UIBC message 450. The size of the timestamp flag may be equal to one bit. In some examples, the timestamp flag may indicate that source device 20 is to read the timestamp field of UIBC message 450 if the timestamp flag is equal to 1. In such examples, the timestamp flag may indicate that source device 20 is not to read the timestamp field of UIBC message 450 if the timestamp flag is equal to 0. In some examples, the expected value of the timestamp flag is 1.

The timestamp field may indicate a time at which sink device 60 received a user input associated with UIBC message 450. The size of the timestamp field may be equal to sixteen bits. Source device 20 may save the timestamp for later processing when source device 20 receives UIBC message 450.

When wireless channel 50 from source device 20 to sink device 60 is congested, user inputs received at sink device 60 may have been applied to outdated display frames displayed by sink device 60. Such user inputs may not be processed when received at source device 20. On the other hand, when the UIBC from sink device 60 to source device 20 is congested, user inputs applied onto sink device 60 may be received too late at source device 20. Such user inputs may also not be processed by source device 20.

The timestamp field may inform source device 20 about the above synchronization problems. The timestamp field may specify a timestamp that is associated with the media data that is being displayed when user inputs are received. Sending such timestamp information may be sufficient to resolve the above synchronization problems.

FIG. 7 is a communication diagram that illustrates an example interaction between source device 20 and sink device 60 to negotiate a UIBC for generic input messages. In the example of FIG. 7, source device 20 sends a message 500 to sink device 60. Message 500 may be a request to get the UIBC capability parameters of sink device 60. Sink device 60 responds to message 500 by sending a message 502 back to source device 20. Message 502 indicates capabilities of sink device 60 to provide generic input messages and HIDC input reports. In the example of FIG. 7, message 502 indicates that sink device 60 can provide generic input messages for a mouse and a single touch touchscreen (i.e., generic_cap_list=Mouse, SingleTouch). Message 502 also indicates that sink device 60 does not provide any HIDC input reports (i.e., hidc_cap_list=none). Example generic inputs that sink device 60 may indicate in a response to a request from source device 20 for generic input message capabilities may include touch/mouse down, touch/mouse up, touch/mouse move, key down, key up, zoom, vertical scroll, horizontal scroll, and rotate.

After source device 20 receives message 502, source device 20 may send a message 504 to sink device 60. Message 504 may instruct sink device 60 to set one or more UIBC parameters. For instance, in the example of FIG. 7, message 504 instructs sink device 60 to set a port number to 1000. After sink device 60 receives message 504, sink device 60 may set the parameter as indicated by message 504 and send a message 506 back to source device 20. Message 506 confirms to source device 20 that sink device 60 set the one or more UIBC parameters as indicated in message 504.

Subsequently, source device 20 may send a message 508 to sink device 60. Message 508 may instruct sink device 60 to set a UIBC parameter (e.g., wfd_uibc_setting) to indicate that a UIBC is enabled. Sink device 60 may respond to message 508 by setting the UIBC parameter to indicate that the UIBC is enabled and by sending a message 510 to confirm that sink device 60 set the UIBC parameter as instructed in message 508.

FIG. 8 is a communication diagram that illustrates an example interaction between source device 20 and sink device 60 to negotiate a UIBC for Human Input Device Command (HIDC) input reports. In the example of FIG. 8, source device 20 sends a message 550 to sink device 60. Message 550 may be a request to get a UIBC capability parameter (wfd_uibc_capability) of sink device 60. Sink device 60 responds to message 550 by sending a message 552 back to source device 20. Message 552 indicates capabilities of sink device 60 to provide generic input messages and HIDC input reports. In the example of FIG. 8, message 552 indicates that sink device 60 can provide HIDC input reports for a BLUETOOTH mouse and an infrared remote control (i.e., hidc_cap_list=Mouse/BT, RemoteControl/Infrared). Message 552 also indicates that sink device 60 does not provide any generic input messages (i.e., generic_cap_list=none).

After source device 20 receives message 552, source device 20 may send a message 554 to sink device 60. Message 554 may instruct sink device 60 to set one or more UIBC parameters. For instance, in the example of FIG. 8, message 554 instructs sink device 60 to set a port number to 1000. After sink device 60 receives message 554, sink device 60 may set the parameter as indicated by message 554 and send a message 556 back to source device 20. Message 556 confirms to source device 20 that sink device 60 set the one or more UIBC parameters as indicated in message 554.

Subsequently, source device 20 may send a message 558 to sink device 60. Message 558 may instruct sink device 60 to set a UIBC parameter (e.g., wfd_uibc_setting) to indicate that a UIBC is enabled. Sink device 60 may respond to message 558 by setting the UIBC parameter to indicate that the UIBC is enabled and by sending a message 560 to confirm that sink device 60 set the UIBC parameter as instructed in message 558. Once the proper generic or HIDC capabilities have been negotiated over RTSP, the UIBC capability is enabled and sink device 60 may send user inputs over the UIBC as sub-elements. In the example of FIG. 8, the UIBC is now established.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method comprising:
   storing, at a source device, a plurality of preconfigured report formats prior to establishing a user input back channel (UIBC) with a sink device configured to receive an indication of user input from a human input device (HID), wherein each of the preconfigured report formats is associated with a different type of HID, wherein the source device does not receive schemas indicating formats for HID command (HIDC) input reports regarding input from particular HIDs, the sink device being a wireless display (WD) sink and the source device being a WD source;
   establishing, by the source device, the UIBC with the sink device;
   receiving, at the source device, one or more Internet Protocol (IP) packets from the sink device, the one or more IP packets comprising a UIBC message sent via the UIBC, the UIBC message comprising a HID command (HIDC) input report generated by the sink device for the user input received by the HID, the HIDC input report describing the user input received by the HID;
   identifying, by the source device, based on data in the one or more IP packets, one of the preconfigured report formats;
   parsing, by the source device, the HIDC input report based on the identified preconfigured report format in order to determine a user input;
   generating, by the source device, media data in response to the user input; and
   sending, by the source device, the media data from the source device to the sink device.

2. The method of claim 1, wherein the preconfigured report formats include schemas.

3. The method of claim 1, wherein receiving the one or more IP packets comprises receiving the one or more IP packets over a wireless communication network.

4. The method of claim 1, wherein the data comprises a numerical identifier that identifies one of the preconfigured report formats.

5. The method of claim 4, wherein the one or more IP packets comprise a message that includes a field that specifies the numerical identifier and a field that contains the HIDC input report.

6. The method of claim 1,
   wherein the data comprises an IP address of the sink device, and
   wherein identifying one of the preconfigured report formats comprises identifying, based at least in part on the IP address of the sink device, one of the preconfigured report formats.

7. The method of claim 6,
   wherein the data comprises the IP address of the sink device and a source port, and
   wherein identifying one of the preconfigured report formats comprises identifying, based at least in part on the IP address of the sink device and the source port, one of the preconfigured report formats.

8. The method of claim 1, further comprising:
   in response to receiving the one or more IP packets from the sink device, determining whether the one or more IP packets comprise a generic input message or the HIDC input report, wherein the generic input message is generic to HIDs belonging to a class of HIDs.

9. A method comprising:
   receiving, by a sink device, an indication of a user input received by a human input device (HID);
   establishing, by the sink device, a user input back channel (UIBC) with a source device, the sink device being a wireless display (WD) sink and the source device being a WD source;
   generating, by the sink device and based on the user input, a HID command (HIDC) input report that conforms to a report format, the HIDC input report describing the user input received by the HID;
   sending, by the sink device, one or more Internet Protocol (IP) packets to a source device, the IP packets comprising a UIBC message sent via the UIBC, the UIBC message comprising the HIDC input report and a HID type indicator that identifies the report format, wherein the sink device does not send schemas to the source device indicating formats for HIDC input reports regarding input from particular HIDs, wherein the HID is one of the particular HIDs; and
   receiving, by the sink device, media data from the source device, the media data based on the user input.

10. The method of claim 9, wherein the HID type indicator comprises a numerical identifier that identifies the report format.

11. The method of claim 10, wherein the one or more IP packets comprise a message that includes a field that specifies the numerical identifier and a field that contains the HIDC input report.

12. The method of claim 9, wherein sending the one or more IP packets comprises sending the IP packets over a wireless communication network.

13. A computing device comprising:
   one or more processors configured to:
      store a plurality of preconfigured report formats prior to establishing a user input back channel (UIBC) with a sink device configured to receive an indication of user input from a human input device (HID), wherein each of the preconfigured report formats is associated with a different type of HID, wherein the computing device does not receive schemas indicating formats for HID command (HIDC) input reports regarding input from particular HIDs, the sink device being a wireless display (WD) sink and the computing device being a WD source;

establish, by the source device, the UIBC with the sink device;

receive one or more Internet Protocol (IP) packets from the sink device, the one or more IP packets comprising a UIBC message sent via the UIBC, the UIBC message comprising a HID command (HIDC) input report generated by the sink device for the user input received by the HID, the HIDC input report describing the user input received by the HID;

identify, based on data in the one or more IP packets, one of the preconfigured report formats;

parse the HIDC input report based on the identified preconfigured report format in order to determine a user input; and generate media data in response to the user input; and a transmitter unit configured to send the media data from the computing device to the sink device.

14. The computing device of claim 13, wherein the preconfigured report formats include schemas.

15. The computing device of claim 13, wherein the computing device receives the one or more IP packets over a wireless communication network.

16. The computing device of claim 13, wherein the data comprises a numerical identifier that identifies one of the preconfigured report formats.

17. The computing device of claim 16, wherein the one or more IP packets comprise a message that includes a field that specifies the numerical identifier and a field that contains the HIDC input report.

18. The computing device of claim 13,
wherein the data comprises an IP address of the sink device, and
wherein the one or more processors are configured to identify, based at least in part on the IP address of the sink device, one of the preconfigured report formats.

19. The computing device of claim 18,
wherein the data comprises the IP address of the sink device and a source port, and
wherein the one or more processors are configured to identify, based at least in part on the IP address of the sink device and the source port, one of the preconfigured report formats.

20. The computing device of claim 13, wherein the one or more processors are configured to determine, in response to receiving the one or more IP packets from the sink device, whether the one or more IP packets comprise a generic input message or the HIDC input report, wherein the generic input message is generic to HIDs belonging to a class of HIDs.

21. A computing device that comprises:
one or more processors configured to:
    receive an indication of user input received by a human input device (HID);
    establish a user input back channel (UIBC) with a source device, the computing device being a wireless display (WD) sink and the source device being a WD source;
    generate, based on the user input, a HID command (HIDC) input report that conforms to a report format, the HIDC input report describing the user input received by the HID; and
    send one or more Internet Protocol (IP) packets to the source device, the IP packets comprising a UIBC message sent via the UIBC, the UIBC message comprising the HIDC input report and a HID type indicator that identifies the report format, wherein the computing device does not send schemas to the source device indicating formats for HIDC input reports regarding input from particular HIDs, wherein the HID is one of the particular HIDs; and a receiver unit configured to receive media data from the source device, the media data based on the user input.

22. The computing device of claim 21, wherein the HID type indicator comprises a numerical identifier that identifies the report format.

23. The computing device of claim 22, wherein the one or more IP packets comprise a message that includes a field that specifies the numerical identifier and a field that contains the HIDC input report.

24. The computing device of claim 21, wherein sending the one or more IP packets comprises sending the one or more IP packets over a wireless communication network.

25. A computing device that comprises:
means for storing a plurality of preconfigured report formats prior to establishing a user input back channel (UIBC) with a sink device configured to receive an indication of user input from a human input device (HID), wherein each of the preconfigured report formats is associated with a different type of HID, wherein the computing device does not receive schemas indicating formats for HID command (HIDC) input reports regarding input from particular HIDs, the sink device being a wireless display (WD) sink and the computing device being a WD source;

means for establishing the UIBC with the sink device;

means for receiving one or more Internet Protocol (IP) packets from the sink device, the one or more IP packets comprising a UIBC message sent via the UIBC, the UIBC message comprising a HID command (HIDC) input report generated by the sink device for the user input received by the HID, the HIDC input report describing the user input received by the HID;

means for identifying, based on data in the one or more IP packets, one of the preconfigured report formats;

means for parsing the HIDC input report based on the identified preconfigured report format in order to determine a user input;

means for generating media data in response to the user input; and means for sending the media data from the computing device to the sink device.

26. The computing device of claim 25, wherein the data comprises a numerical identifier that identifies one of the preconfigured report formats.

27. A computing device that comprises:
means for receiving an indication of user input received by a human input device (HID);
means for establishing a user input back channel (UIBC) with a source device, the computing device being a wireless display (WD) sink and the source device being a WD source;
means for generating, based on the user input, a HID command (HIDC) input report that conforms to a report format, the HIDC input report describing the user input received by the HID;
means for sending one or more Internet Protocol (IP) packets to a source device, the IP packets a UIBC message sent via the UIBC, the UIBC message comprising the HIDC input report and a HID type indicator that identifies the report format, wherein the computing device does not send schemas to the source device indicating formats for HIDC input reports regarding input from particular HIDs, wherein the HID is one of the particular HIDs; and means for receiving media data from the source device, the media data based on the user input.

28. The computing device of claim 27, wherein the HID type indicator comprises a numerical identifier that identifies one of the preconfigured report formats.

29. A non-transitory computer readable storage medium that stores instructions that, when executed, configure one or more processors of a computing device to:

store, at the computing device, a plurality of preconfigured report formats prior to establishing a user input back channel (UIBC) with a sink device configured to receive an indication of user input from a human input device (HID), wherein each of the preconfigured report formats is associated with a different type of HID, wherein the computing device does not receive schemas indicating formats for HID command (HIDC) input reports regarding input from particular HIDs, the sink device being a wireless display (WD) sink and the computing device being a WD source;

establish the UIBC with the sink device;

receive one or more Internet Protocol (IP) packets from the sink device, the one or more IP packets comprising a UIBC message sent via the UIBC, the UIBC message comprising a HID command (HIDC) input report generated by the sink device for the user input received by the HID, the HIDC input report describing the user input received by the HID;

identify, based on data in the one or more IP packets, one of the preconfigured report formats;

parse the HIDC input report based on the identified preconfigured report format in order to determine a user input;

generate media data in response to the user input; and send the media data from the source device to the sink device.

30. The computer program product of claim 29, wherein the data comprises a numerical identifier that identifies one of the preconfigured report formats.

31. A non-transitory computer readable storage medium that stores instructions that, when executed, configure one or more processors of a computing device to:

receive an indication of user input received by a human input device (HID);

establish a user input back channel (UIBC) with a source device, the computing device being a wireless display (WD) sink and the source device being a WD source;

generate, based on the user input, a HID command (HIDC) input report that conforms to a report format, the HIDC input report describing the user input received by the HID;

send one or more Internet Protocol (IP) packets to a source device, the IP packets comprising a UIBC message sent via the UIBC, the UIBC message comprising the HIDC input report and a HID type indicator that identifies the report format, wherein the computing device does not send to schemas to the source device indicating formats for HIDC input reports regarding input from particular HIDs, wherein the HID is one of the particular HIDs; and receive media data from the source device, the media data based on the user input.

32. The computer program product of claim 31, wherein the HID type indicator comprises a numerical identifier that identifies one of the preconfigured report formats.

* * * * *